US010951381B2

(12) United States Patent
Li et al.

(10) Patent No.: US 10,951,381 B2
(45) Date of Patent: Mar. 16, 2021

(54) CSI REFERENCE RESOURCE DEFINITION FOR CSI REPORT IN NR

(71) Applicant: Telefonaktiebolaget LM Ericsson (publ), Stockholm (SE)

(72) Inventors: Shaohua Li, Beijing (CN); Mattias Frenne, Uppsala (SE); Sebastian Faxér, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/337,652

(22) PCT Filed: Nov. 19, 2018

(86) PCT No.: PCT/SE2018/051194
§ 371 (c)(1),
(2) Date: Mar. 28, 2019

(87) PCT Pub. No.: WO2019/098938
PCT Pub. Date: May 23, 2019

(65) Prior Publication Data
US 2020/0052861 A1 Feb. 13, 2020

Related U.S. Application Data

(60) Provisional application No. 62/587,509, filed on Nov. 17, 2017.

(51) Int. Cl.
*H04L 5/00* (2006.01)
*H04W 72/04* (2009.01)

(52) U.S. Cl.
CPC .......... *H04L 5/0057* (2013.01); *H04L 5/0051* (2013.01); *H04W 72/044* (2013.01); *H04W 72/0413* (2013.01)

(58) Field of Classification Search
None
See application file for complete search history.

(56) References Cited

U.S. PATENT DOCUMENTS

2018/0359069 A1\* 12/2018 Nam .................... H04B 17/373
2019/0140801 A1\* 5/2019 Ko .......................... H04L 5/005
(Continued)

FOREIGN PATENT DOCUMENTS

WO 2018237258 A1 12/2018

OTHER PUBLICATIONS

Author Unknown, "Technical Specification Group Radio Access Network; Evolved Universal Terrestrial Radio Access (E-UTRA); Physical layer procedures (Release 14)," Technical Specification 36.213, Version 14.4.0, 3GPP Organizational Partners, Sep. 2017, 462 pages.

(Continued)

*Primary Examiner* — Diane L Lo
(74) *Attorney, Agent, or Firm* — Withrow & Terranova, PLLC

(57) ABSTRACT

Embodiments of methods for providing a new Channel State Information (CSI) reference resource definition for CSI reports in New Radio (NR) are disclosed. In some embodiments, a method performed by a wireless device for Channel Quality Indicator (CQI) index reporting in a wireless communication system comprises deriving a CQI index to be reported to a network node, where the CQI index is derived assuming a hypothetical transmission on a CSI reference resource, wherein a wireless device-specific reference signal overhead in the CSI reference resource is consistent with one or more parameters, and reporting the CQI index to the network node. In another embodiment, a method performed by a radio access node reporting in a wireless communication system comprises receiving a CQI index from a wireless (Continued)

device for a CSI reference resource, wherein a wireless device-specific reference signal overhead in the CSI reference resource is consistent with one or more parameters.

26 Claims, 14 Drawing Sheets

(56) References Cited

U.S. PATENT DOCUMENTS

| | | | |
|---|---|---|---|
| 2019/0273544 A1* | 9/2019 | Cha | H04L 1/0026 |
| 2020/0008228 A1* | 1/2020 | Lee | H04L 5/001 |
| 2020/0021413 A1* | 1/2020 | Park | H04W 72/0413 |
| 2020/0028647 A1* | 1/2020 | Kim | H04L 5/0007 |

OTHER PUBLICATIONS

Author Unknown, "Technical Specification Group Radio Access Network; NR; Physical channes and modulation (Release 15)," Technical Specification 38.211, Version 1.0.0, 3GPP Organizational Partners, Sep. 2017, 37 pages.

Author Unknown, "Tdoc R1-1719227: Technical Specification Group Radio Access Network; NR; Physical layer procedures for data (Release 15)," Technical Specification 38.214, Version 1.1.1, 3GPP Organizational Partners, Oct. 2017, 55 pages.

Author Unknown, "Technical Specification Group Radio Access Network; NR; Radio Resource Control (RRC); Protocol specification (Release 15)," Technical Specification 38.331, Version 0.1.0, 3GPP Organizational Partners, Oct. 2017, 42 pages.

AT&T, "R1-1809741: Summary of CQI/MCS," 3GPP TSG RAN WG1 Meeting #94, Gothenbum, Sweden, Aug. 20-24, 2018, 4 pages.

Ericsson, "R1-1719595: CQI Tables and MCS Tables for NR," 3GPP TSG RAN WG1 Meeting 91, Reno, USA, Nov. 27-Dec. 1, 2017, 19 pages.

LG Electronics, "R1-1713157: on DL PT-RS design," 3GPP TSG RAN WG1 Meeting #90, Prague, Czech Republic, Aug. 21-25, 2017, 5 pages.

ZTE, "R1-1713489: on NR CQI and MCS," 3GPP TSG RAN WG1 Meeting #90, Prague, Czechia, Aug. 21-25, 2017, 3 pages.

ZTE, et al., "R1-1715442: on CQI and MCS," 3GPP TSG RAN WG1 Meeting NR #3, Nagoya, Japan, Sep. 18-21, 2017, 9 pages.

International Search Report and Written Opinion for International Patent Application No. PCT/SE2018/051194, dated Mar. 29, 2019, 13 pages.

\* cited by examiner

DL-DMRS-len = 1, DL-DMRS-add-pos = 1, and DL-DMRS-config-type = 1

DL-DMRS-len = 1, DL-DMRS-add-pos = 1, and DL-DMRS-config-type = 1

*Illustration of PTRS pattern when $K_{PTRS} = 2$*

*One example predefined rule for PTRS density determination in CSI reference resource*

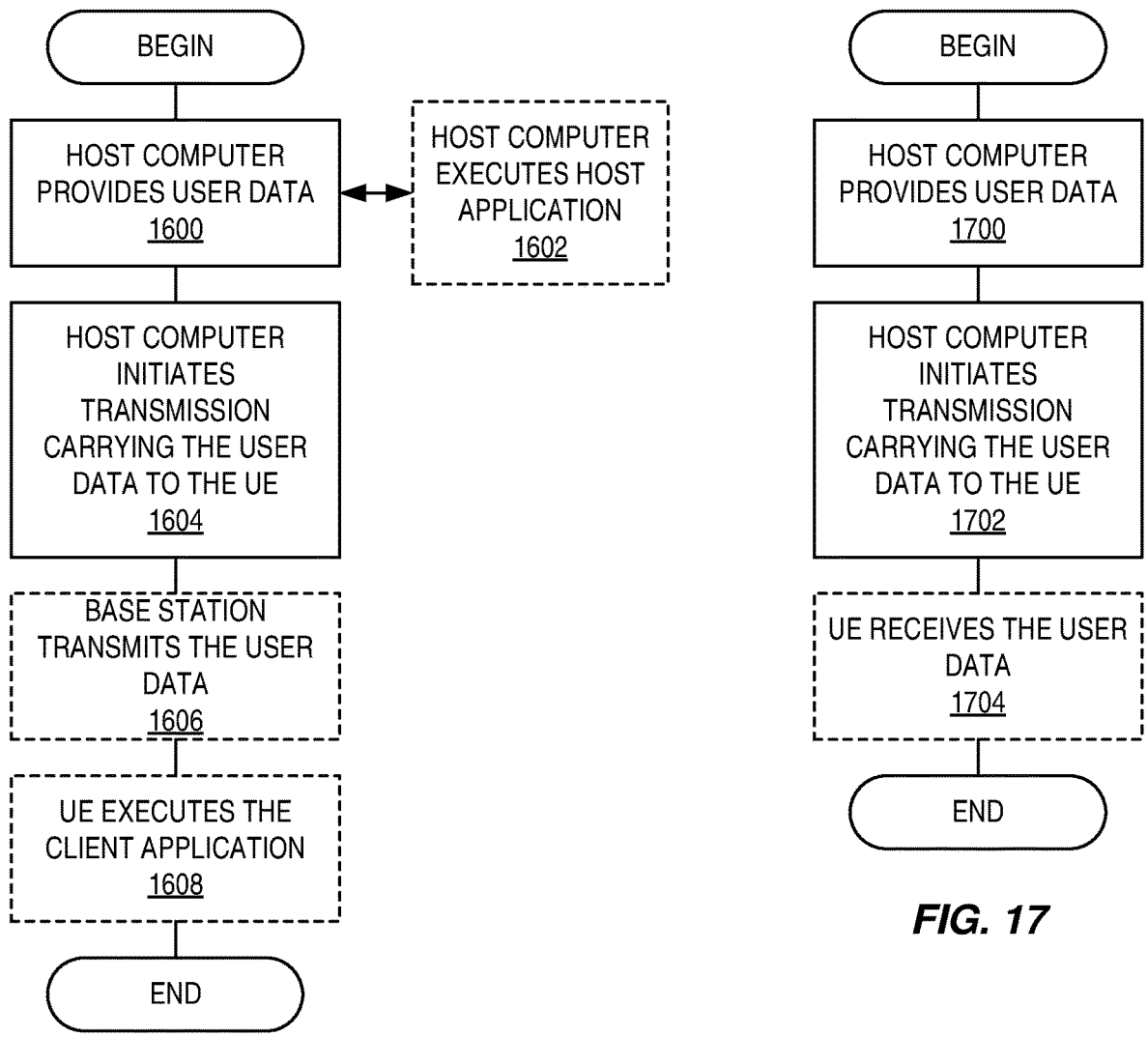

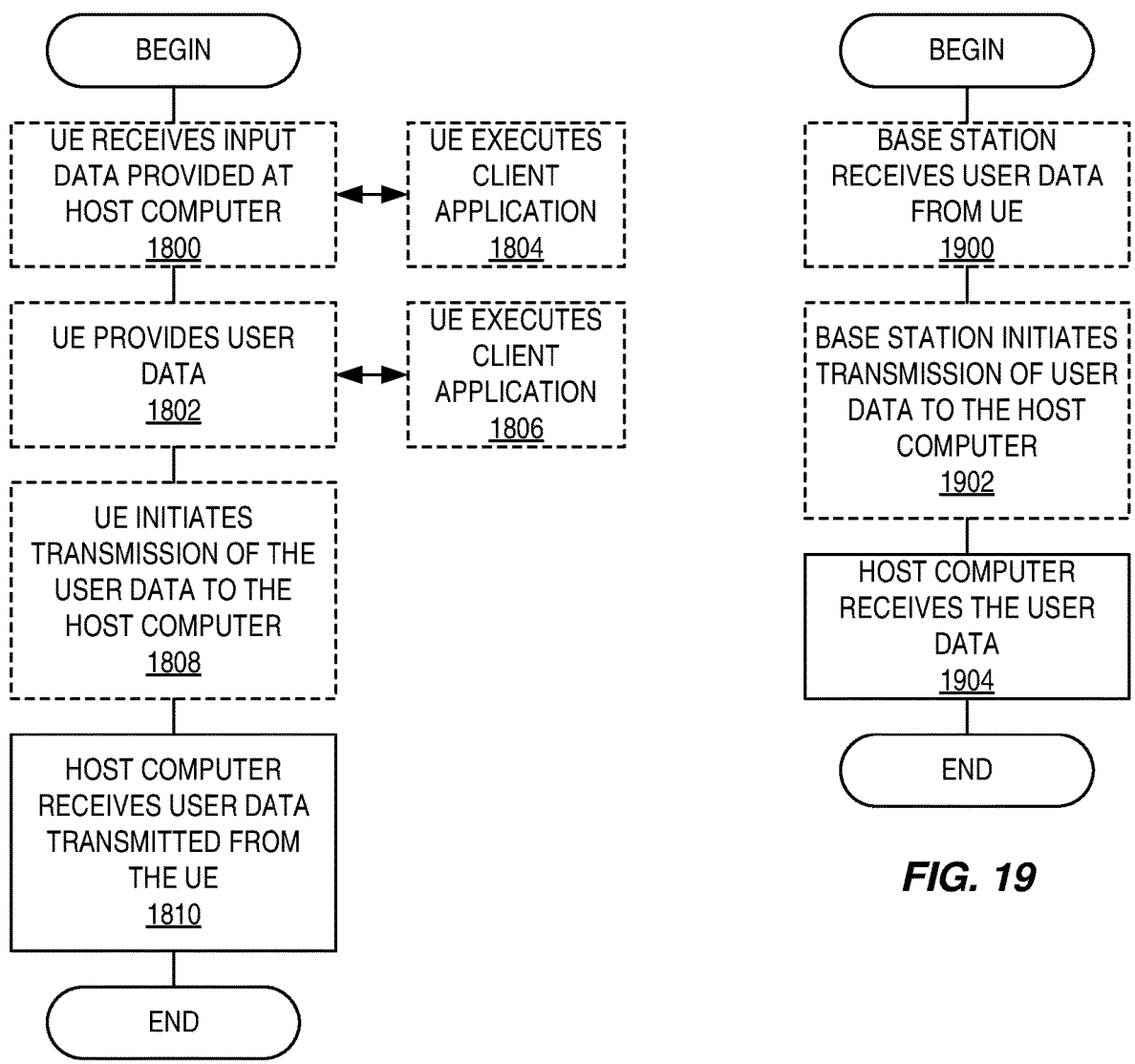

CSI REFERENCE RESOURCE DEFINITION FOR CSI REPORT IN NR

RELATED APPLICATIONS

This application is a 35 U.S.C. § 371 national phase filing of International Application No. PCT/SE2018/051194, filed Nov. 19, 2018, which claims the benefit of provisional patent application Ser. No. 62/587,509, filed Nov. 17, 2017, the disclosures of which are hereby incorporated herein by reference in their entireties.

TECHNICAL FIELD

The present disclosure relates to Channel Quality Index, CQI, reporting in a cellular communications network.

BACKGROUND

In Third Generation Partnership Project (3GPP) Technical Specification (TS) 36.213, the Channel Quality Index (CQI) definition is given. For a User Equipment device (UE), based on an observation interval in time, and an observation interval in frequency, the User Equipment device (UE) shall derive, for each CQI value reported in uplink subframe, the highest CQI index which satisfies the following condition, or CQI index 0 if CQI index 1 does not satisfy the condition:

A single Physical Downlink Shared Channel (PDSCH) transport block with a combination of modulation scheme and transport block size corresponding to the CQI index, and occupying a group of downlink physical resource blocks termed the Channel State Information (CSI) reference resource, could be received with a transport block error probability not exceeding a given threshold.

The CSI reference resource for a serving cell is defined as follows:

In the frequency domain, the CSI reference resource is defined by the group of downlink physical resource blocks corresponding to the band to which the derived CQI value relates In the time domain, the CSI reference resource is defined by a single downlink or special subframe to which the derived CQI values related In the layer domain, the CSI reference resource is defined by any Rank Indicator (RI) and Precoding Matrix Indicator (PMI) on which the CQI is conditioned In the CSI reference resource, for the purpose of deriving the CQI index, the UE shall make some assumption about the control channel configuration, numerology (e.g., Cyclic Prefix (CP) length and subcarrier spacing) for PDSCH reception, resource elements used by primary or secondary synchronization signals or Physical Broadcast Channel (PBCH), redundancy version, the ratio of PDSCH Energy Per Resource Element (EPRE) to CSI Reference Signal (CSI-RS) EPRE, Resource Elements (REs) used for CSI-RS and zero-power CSI-RS and the PDSCH transmission format, etc. For example, in New Radio (NR) specification R1-1719227, the UE shall assume the following for the purpose of deriving the CQI index:

The first [3] Orthogonal Frequency Division Multiplexing (OFDM) symbols are occupied by control signaling
The reference resource uses the CP length and subcarrier spacing configured for PDSCH reception
No resource elements used by primary or secondary synchronization signals or PBCH
Redundancy Version 0
The ratio of PDSCH EPRE to CSI-RS EPRE is as given in Subclause 4.1
Assume no REs allocated for CSI-RS and zero-power CSI-RS
The PDSCH transmission scheme where the UE may assume that the NR base station (referred to as a gNB) transmission on the PDSCH would be performed with up to eight transmission layers on antenna ports [1000-1011] as defined in Subclause 7.3.1.4 of 3GPP TS 38.211.

In 3GPP TS 36.213 or 3GPP TS 38.214, one example CQI table is defined as Table 1. In this CQI table, the CQI index indicates a combination of modulation scheme and transport block size corresponding to a single PDSCH transport block.

TABLE 1

4-bit CQI Table

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The UE shall assume the PDSCH DMRS being mapped to physical resources according to type 1 or type 2 as given by the higher-layer parameter DL-DMRS-config-type.

The UE shall assume the sequence r(m) is mapped to physical resource elements according to $$a_{k,l}^{(p,\mu)} = \beta_{DMRS} w_f(k') \cdot w_t(l') \cdot r(2m + k' + m_0)$$

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \{l_0, \bar{l}\} + l'$$

where $w_f(k')$, $w_t(l')$, and $\Delta$ are given by Tables 7.4.1.1.2-1 and 7.4.1.1.2-2.

For briefing, for RE set occupied by DMRS with k'=0, it is named as "comb0" and for RE set occupied by DMRS with k'=1, it is named as "comb1".

The reference point for l and the position $l_0$ of the first DMRS symbol depends on the mapping type:

for PDSCH mapping type A:
  l is defined relative to the start of the slot
  $l_0$=3 if the higher-layer parameter DL-DMRS-typeA-pos equals 3 and $l_0$=2 otherwise
for PDSCH mapping type B:
  l is defined relative to the start of the scheduled PDSCH resources
  $l_0$=0

The position(s) of additional DMRS symbols is given by $\bar{l}$ and the last OFDM symbol used for PDSCH in the slot according to Tables 7.4.1.1.2-3 and 7.4.1.1.2-4.

The time-domain index l' and the supported antenna ports p depend on DL-DMRS-len according to Table 7.4.1.1.2-5.

TABLE 7.4.1.1.2-1

Parameters for PDSCH DMRS configuration type 1 for single-symbol DMRS

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

TABLE 7.4.1.1.2-2

Parameters for PDSCH DMRS configuration type 2 for single-symbol DMRS

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

TABLE 7.4.1.1.2-3

Additional PDSCH DMRS positions $\bar{l}$ when DL-DMRS-len equals 1

| Position of last PDSCH symbol | Additional DMRS positions $\bar{l}$ | | | | | | | |
|---|---|---|---|---|---|---|---|---|
| | PDSCH mapping type A DL-DMRS-add-pos | | | | PDSCH mapping type B DL-DMRS-add-pos | | | |
| | 0 | 1 | 2 | 3 | 0 | 1 | 2 | 3 |
| ≤7 | — | | | | — | | | |
| 8 | — | 7 | | | | | | |
| 9 | — | 9 | 6, 9 | | | | | |
| 10 | — | 9 | 6, 9 | | | | | |
| 11 | — | 9 | 6, 9 | 5, 8, 11 | | | | |
| 12 | — | 11 | 7, 11 | 5, 8, 11 | | | | |
| 13 | — | 11 | 7, 11 | 5, 8, 11 | | | | |

TABLE 7.4.1.1.2-4

Additional PDSCH DMRS positions $\bar{l}$ when DL-DMRS-len equals 2

| Position of last PDSCH symbol | Additional DMRS positions $\bar{l}$ | | | | | |
|---|---|---|---|---|---|---|
| | PDSCH mapping type A DL-DMRS-add-pos | | | PDSCH mapping type B DL-DMRS-add-pos | | |
| | 0 | 1 | 2 | 0 | 1 | 2 |
| ≤7 | — | | | — | | |
| 8 | — | | | | | |
| 9 | — | | | | | |
| 10 | — | 8 | | | | |
| 11 | — | 8 | | | | |
| 12 | — | 10 | | | | |
| 13 | — | 10 | | | | |

TABLE 7.4.1.1.2-5

PDSCH DMRS time index l' and antenna ports p

| | | Supported antenna ports p | |
|---|---|---|---|
| DL-DMRS-len | l' | Configuration type 1 | Configuration type 2 |
| 1 | 0 | 1000-1003 | 1000-1005 |
| 2 | 0, 1 | 1000-1007 | 1000-1011 |

As one example of DL-DMRS-len=1, DL-DMRS-add-pos=1 and DL-DMRS-config-type=1, the DMRS pattern can be shown as FIG. 1.

As another example, DL-DMRS-len=1, DL-DMRS-add-pos=2 and DL-DMRS-config-type=1, the DMRS pattern can be shown as FIG. 2.

In 3GPP TS 38.211, the PTRS definition is given. The UE shall assume phase-tracking reference signals being present only in the resource blocks used for the PDSCH, and only if the higher-layer parameter DL-PTRS-present indicates phase-tracking reference signals being used.

If present, the UE shall assume the PDSCH PTRS being mapped to physical resources according to $$a_{k,l}^{(p,\mu)} = \beta_{PTRS} r(m)$$

$$l = l_{DMRS} + 1 + L_{PTRS} \cdot l'$$

$$l' = 0, 1, 2, \ldots$$

in every $K_{PTRS}$ of the scheduled resource blocks, starting with the lowest numbered resource block scheduled when the following conditions are fulfilled
- l is within the OFDM symbols allocated for the PDSCH transmission
- the resource element (k,l) is not used for DMRS and where
- the index k refers to the subcarrier number within a physical resource block
- $l_{DM-RS}$ equals $l_0$ in case of one symbol DMRS and $l_0+1$ in case of two symbols DMRS where $l_0$ is defined in clause 7.4.1.1.2
- $K_{PTRS} \in \{2,4\}$ is given by [6, TS38.214]
- $L_{PT-RS} \in \{1,2,4\}$ is given by [6, TS38.214]

As one example, when $K_{PTRS}=2$ and $L_{PTRS}=1$, the PTRS pattern is illustrated as shown in FIG. 3.

In 3GPP TS 38.214, the procedure for the PTRS usage is given.

If a UE is configured with the higher parameter DL-PTRS-present and if the additional higher layer parameters DL-PTRS-time-density and DL-PTRS-frequency-density are configured, the UE may assume the PTRS antenna ports' presence and pattern are a function of the corresponding scheduled MCS and scheduled bandwidth as shown in Table 2 and Table 3, otherwise the UE may assume that PTRS is present in every OFDM symbol and in every second Physical Resource Block (PRB).

TABLE 2

Time density of PTRS as a function of scheduled MCS

| Scheduled MCS | Time density($L_{PT\text{-}RS}$) |
|---|---|
| $I_{MCS}$ < ptrs-MCS$_1$ | PTRS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ | 1 |

TABLE 3

Frequency density of PTRS as a function of scheduled bandwidth

| Scheduled bandwidth | Frequency density ($K_{PT\text{-}RS}$) |
|---|---|
| $N_{RB}$ < $N_{RB0}$ | PTRS is not present |
| $N_{RB0}$ ≤ $N_{RB}$ < $N_{RB1}$ | 2 |
| $N_{RB1}$ ≤ $N_{RB}$ | 4 |

SUMMARY

Systems and methods are disclosed herein for providing a new Channel State Information (CSI) reference resource definition for CSI reports in a cellular communications network such as, e.g., New Radio (NR). Embodiments of a method performed by a wireless device for Channel Quality Indicator (CQI) index reporting in a wireless communication system are disclosed. In some embodiments, the method comprises deriving a CQI index to be reported to a network node, where the CQI index is derived assuming a hypothetical transmission on a CSI reference resource, wherein a wireless device-specific reference signal overhead in the CSI reference resource is consistent with one or more parameters. The method further comprises reporting the CQI index to the network node.

In some embodiments, the one or more parameters comprise a most recent reported rank for a respective CSI Report Setting, a number of additional Demodulation Reference Signal (DMRS) symbols, and/or a DMRS pattern. Some embodiments may provide that the one or more parameters comprise a number of front loaded DMRS symbols, reserved resources configured for the wireless device, and/or a number of Orthogonal Frequency Division Multiplexing (OFDM) symbols in the CSI reference resource. According to some embodiments, the number of OFDM symbols in the CSI reference resource is a number of OFDM symbols used in a corresponding valid downlink subframe related to the CSI reference resource. In some embodiments, the one or more parameters comprise a semi-statically configured slot-format.

In some embodiments, the CQI index is associated with a Phase Tracking Reference Signal (PTRS), density and/or pattern within the CSI reference resource. According to some embodiments, the CQI index is associated with the PTRS density and/or pattern via a configuration, via a predefined association, and/or via a predefined rule.

In some embodiments, deriving the CQI index to be reported comprises deriving the CQI index to be reported based on the wireless device-specific reference signal overhead in the CSI reference resource, and PTRS overhead in the CSI reference resource, wherein the PTRS overhead in the CSI reference resource varies for different CQI indices in accordance with PTRS densities and/or patterns associated with the different CQI indices.

In some embodiments, the CQI index is one of a plurality of CQI indices, and at least two CQI indices of the plurality of CQI indices are associated with different PTRS densities and/or patterns.

Embodiments of a wireless device for CQI index reporting in a wireless communication system are also disclosed. In some embodiments, the wireless device comprises one or more transmitters and one or more receivers, and one or more processors associated with the one or more transmitters and the one or more receivers. The one or more processors are configured to cause the wireless device to derive a CQI index to be reported to a network node, where the CQI index is derived assuming a hypothetical transmission on a CSI reference resource, wherein a wireless device-specific reference signal overhead in the CSI reference resource is consistent with one or more parameters. The one or more processors are further configured to cause the wireless device to report the CQI index to the network node.

Embodiments of a wireless device for CQI index reporting in a wireless communication system are also disclosed. In some embodiments, the wireless device comprises one or more transmitters and one or more receivers, and one or more processors associated with the one or more transmitters and the one or more receivers. The one or more processors are adapted to cause the wireless device to derive a CQI index to be reported to a network node, where the CQI index is derived assuming a hypothetical transmission on a CSI reference resource, wherein a wireless device-specific reference signal overhead in the CSI reference resource is consistent with one or more parameters. The one or more processors are further adapted to cause the wireless device to report the CQI index to the network node.

Embodiments of a method performed by a wireless device for CQI index reporting in a wireless communication system are also disclosed. In some embodiments, the method comprises deriving a CQI index to be reported to a network node, where the CQI index is derived assuming a hypothetical transmission on a CSI reference resource, the CQI index being associated with a PTRS density and/or pattern within the CSI reference resource. The method further comprises reporting the CQI index to the network node.

In some embodiments, the CQI index is associated with the PTRS density and/or pattern via a configuration, via a predefined association, and/or via a predefined rule. In some embodiments, deriving the CQI index to be reported comprises deriving the CQI index to be reported based on the PTRS density and/or pattern associated with the CQI index.

In some embodiments, deriving the CQI index to be reported comprises deriving the CQI index to be reported based on a plurality of PTRS densities and/or patterns associated with a plurality of CQI indices.

In some embodiments, the CQI index is one of a plurality of CQI indices and at least two of the plurality of CQI indices are associated with different PTRS densities and/or patterns.

Embodiments of a wireless device for CQI index reporting in a wireless communication system are also disclosed.

In some embodiments, the wireless device comprises one or more transmitters and one or more receivers, and one or more processors associated with the one or more transmitters and the one or more receivers. The one or more processors are configured to cause the wireless device to derive a CQI index to be reported to a network node, where the CQI index is derived assuming a hypothetical transmission on a CSI, reference resource, the CQI index being associated with a PTRS density and/or pattern within the CSI reference resource. The one or more processors are further configured to cause the wireless device to report the CQI index to the network node.

Embodiments of a wireless device for CQI index reporting in a wireless communication system are also disclosed. In some embodiments, the wireless device comprises one or more transmitters and one or more receivers, and one or more processors associated with the one or more transmitters and the one or more receivers. The one or more processors are adapted to cause the wireless device to derive a CQI index to be reported to a network node, where the CQI index is derived assuming a hypothetical transmission on a CSI reference resource, the CQI index being associated with a PTRS density and/or pattern within the CSI reference resource. The one or more processors are further adapted to cause the wireless device to report the CQI index to the network node.

Embodiments of a method performed by a wireless device for deriving a CQI index to be reported by the wireless device in a wireless communication system are also disclosed. In some embodiments, the method comprises selecting a Modulation and Coding Scheme (MCS) index. The method further comprises obtaining a PTRS pattern and/or density according to the MCS index. The method also comprises determining a physical downlink channel performance given the MCS index and the PTRS pattern and/or density. The method additionally comprises determining whether the physical downlink channel performance satisfies a predefined or preconfigured performance threshold. The method further comprises, if the determined physical downlink channel performance satisfies the predefined or preconfigured performance threshold, selecting the MCS index as a MCS index for further CQI index derivation. The method also comprises deriving a CQI index to be reported by the wireless device based on the MCS index selected for further CQI index derivation.

In some embodiments, if the determined physical downlink channel performance does not satisfy the predefined or preconfigured performance threshold, the method further comprises selecting a second MCS index. The method also comprises obtaining a second PTRS pattern and/or density according to the second MCS index. The method additionally comprises determining a second physical downlink channel performance given the second MCS index and the second PTRS pattern and/or density. The method further comprises determining whether the second physical downlink channel performance satisfies the predefined or preconfigured performance threshold. The method also comprises, if the second physical downlink channel performance satisfies the predefined or preconfigured performance threshold, selecting the second MCS index as the MCS index for further CQI index derivation. The method additionally comprises deriving the CQI index to be reported by the wireless device based on the MCS index selected for further CQI index derivation.

In some embodiments, the method further comprises providing user data, and forwarding the user data to a host computer via a transmission to a radio access node.

Embodiments of a wireless device for CQI index reporting in a wireless communication system are also disclosed. In some embodiments, the wireless device comprises one or more transmitters and one or more receivers, and one or more processors associated with the one or more transmitters and the one or more receivers. The one or more processors are configured to cause the wireless device to select a MCS index, and obtain a PTRS pattern and/or density according to the MCS index. The one or more processors are further configured to cause the wireless device to determine a physical downlink channel performance given the MCS index and the PTRS pattern and/or density, and determine whether the physical downlink channel performance satisfies a predefined or preconfigured performance threshold. If the determined physical downlink channel performance satisfies the predefined or preconfigured performance threshold, the one or more processors are configured to cause the wireless device to select the MCS index as a MCS index for further CQI index derivation, and derive a CQI index to be reported by the wireless device based on the MCS index selected for further CQI index derivation.

Embodiments of a wireless device for CQI index reporting in a wireless communication system are also disclosed. In some embodiments, the wireless device comprises one or more transmitters and one or more receivers, and one or more processors associated with the one or more transmitters and the one or more receivers. The one or more processors are adapted to cause the wireless device to select a MCS index, and obtain a PTRS pattern and/or density according to the MCS index. The one or more processors are further adapted to cause the wireless device to determine a physical downlink channel performance given the MCS index and the PTRS pattern and/or density, and determine whether the physical downlink channel performance satisfies a predefined or preconfigured performance threshold. If the determined physical downlink channel performance satisfies the predefined or preconfigured performance threshold, the one or more processors are adapted to cause the wireless device to select the MCS index as a MCS index for further CQI index derivation, and derive a CQI index to be reported by the wireless device based on the MCS index selected for further CQI index derivation.

Embodiments of a method performed by a radio access node for CQI index reporting in a wireless communication system are also disclosed. In some embodiments, the method comprises receiving a reported CQI index from a wireless device for a CSI reference resource, wherein a wireless device-specific reference signal overhead in the CSI reference resource is consistent with one or more parameters.

In some embodiments, the one or more parameters comprise a most recent reported rank for a respective CSI Report Setting, a number of additional DMRS symbols, and/or a DMRS pattern. Some embodiments may provide that the one or more parameters comprise a number of front loaded DMRS symbols, reserved resources configured for the wireless device, and/or a number of OFDM symbols in the CSI reference resource. According to some embodiments, the number of OFDM symbols in the CSI reference resource is a number of OFDM symbols used in a corresponding valid downlink subframe related to the CSI reference resource. In some embodiments, the one or more parameters comprise a semi-statically configured slot-format.

In some embodiments, the reported CQI index is associated with a PTRS density and/or pattern within the CSI reference resource. In some embodiments, the reported CQI index is associated with the PTRS density and/or pattern via a configuration, via a predefined association, and/or via a predefined rule.

In some embodiments, the reported CQI index is one of a plurality of CQI indices, and at least two CQI indices of the plurality of CQI indices are associated with different PTRS densities and/or patterns.

In some embodiments, the method further comprises obtaining user data, and forwarding the user data to a host computer or the wireless device.

Embodiments of a radio access node for CQI index reporting in a wireless communication system are also disclosed. In some embodiments, the radio access node comprises one or more transmitters and one or more receivers, and one or more processors associated with the one or more transmitters and the one or more receivers. The one or more processors are configured to cause the wireless device to receive a reported CQI index from a wireless device for a CSI reference resource, wherein a wireless device-specific reference signal overhead in the CSI reference resource is consistent with one or more parameters.

Embodiments of a radio access node for CQI index reporting in a wireless communication system are also disclosed. In some embodiments, the radio access node comprises one or more transmitters and one or more receivers, and one or more processors associated with the one or more transmitters and the one or more receivers. The one or more processors are adapted to cause the wireless device to receive a reported CQI index from a wireless device for a CSI reference resource, wherein a wireless device-specific reference signal overhead in the CSI reference resource is consistent with one or more parameters.

Embodiments of a method performed by a radio access node for CQI index reporting in a wireless communication system are also disclosed. In some embodiments, the method comprises receiving a reported CQI index from a wireless device for a CSI reference resource, the reported CQI index being associated with a PTRS density and/or pattern within the CSI reference resource.

In some embodiments, the reported CQI index is associated with the PTRS density and/or pattern via a configuration, via a predefined association, and/or via a predefined rule.

In some embodiments, the reported CQI index is one of a plurality of CQI indices, and at least two CQI indices of the plurality of CQI indices are associated with different PTRS densities and/or patterns.

Embodiments of a radio access node for CQI index reporting in a wireless communication system are also disclosed. In some embodiments, the radio access node comprises one or more transmitters and one or more receivers, and one or more processors associated with the one or more transmitters and the one or more receivers. The one or more processors are configured to cause the wireless device to receive a reported CQI index from a wireless device for a CSI reference resource, the reported CQI index being associated with a PTRS density and/or pattern within the CSI reference resource.

Embodiments of a radio access node for CQI index reporting in a wireless communication system are also disclosed. In some embodiments, the radio access node comprises one or more transmitters and one or more receivers, and one or more processors associated with the one or more transmitters and the one or more receivers. The one or more processors are adapted to cause the wireless device to receive a reported CQI index from a wireless device for a CSI reference resource, wherein a wireless device-specific reference signal overhead in the CSI reference resource is consistent with one or more parameters.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 16 illustrates a flowchart illustrating a method implemented in a communication system according to some embodiments of the present disclosure;

FIG. 17 illustrates a flowchart illustrating a method implemented in a communication system according to other embodiments of the present disclosure;

FIG. 18 illustrates a flowchart illustrating a method implemented in a communication system according to still other embodiments of the present disclosure; and FIG. 19 illustrates a flowchart illustrating a method implemented in a communication system according to yet other embodiments of the present disclosure.

DETAILED DESCRIPTION

Figure 1:
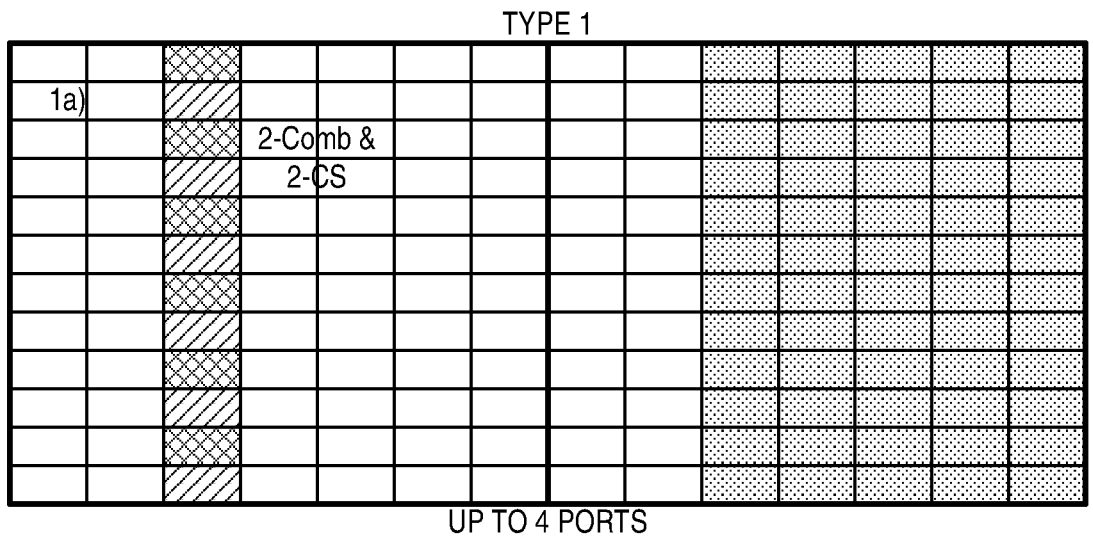
FIG. 1 illustrates a Demodulation Reference Signal (DMRS) pattern when DL-DMRS-len=1, DL-DMRS-add-pos=1 and DL-DMRS-config-type=1.
Figure 2:
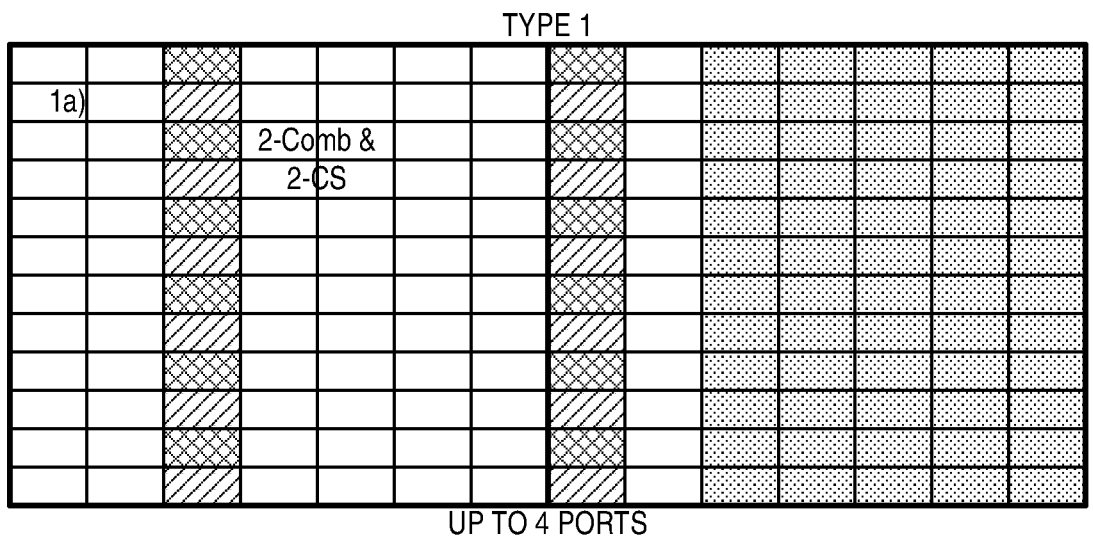
FIG. 2 illustrates the DMRS pattern when DL-DMRS-len=1, DL-DMRS-add-pos=2 and DL-DMRS-config-type=1.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) Node B (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s) present with existing solutions. As shown above, the current CQI definition is associated with the CSI reference resource. The overhead for the CSI reference resource is pre-known when UE derives the CQI value. For a single PDSCH transport block with a combination of modulation scheme and transport block size corresponding to the CQI index, when the same number of REs as the CSI reference resource is used for this PDSCH transmission, the Block Error Rate (BLER) is expected to be not exceeding a given threshold.

However, in current NR, the overhead for the CSI reference resource may be NOT pre-known. If the overhead is not pre-known, the gNB and UE may obtain different Transport Block Size (TBS) based on the same spectral efficiency. Thus, it will lead to some misunderstanding for the gNB for the reported CQI. There are two factors which lead to the problem.

The first factor is the overhead for the PDSCH transmission may change dynamically. According to current RAN1 discussion, the DMRS overhead may be dynamically changed. For example, for Single User Multiple Input Multiple Output (SU-MIMO) and when two layers are configured, two mapping methods can be used for the DMRS port mapping to the comb. In the first mapping method, two ports are mapped into the same comb. In the second mapping method, two ports are mapped into different combs. Which mapping method is used may be indicated dynamically by Downlink Control Information (DCI). As one example shown in FIG. 1, when the first mapping method is used, only REs marked with cross hatching are used for DMRS two-layer transmission; when the second mapping method is used, REs marked with cross hatching will be used for one-layer DMRS transmission, and REs marked with diagonal hatching will be used for the other layer DMRS transmissions. The overhead for the second mapping method is larger than that with the first mapping method.

Figure 3:
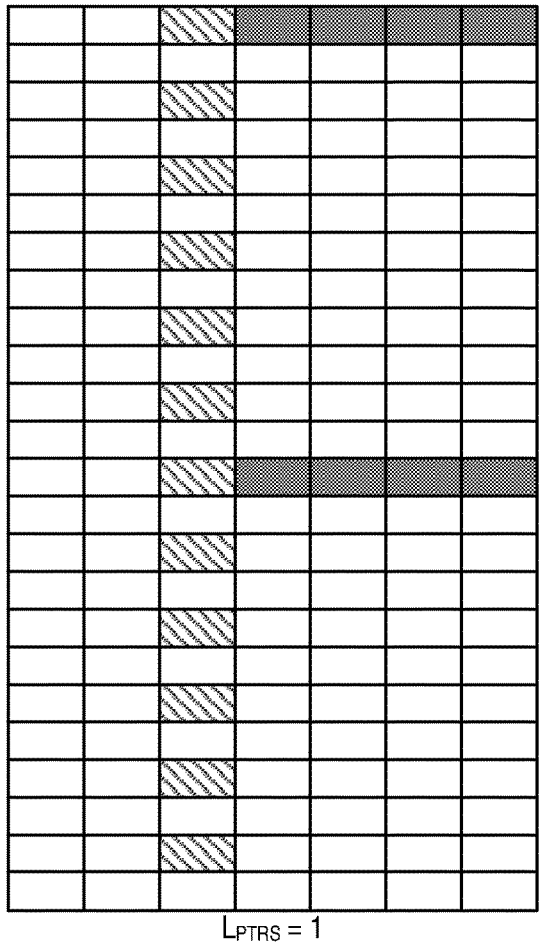
FIG. 3 illustrates the Phase Tracking Reference Signal (PTRS) pattern when $K_{PTRS}=2$ and $L_{PTRS}=1$.
Figure 3:
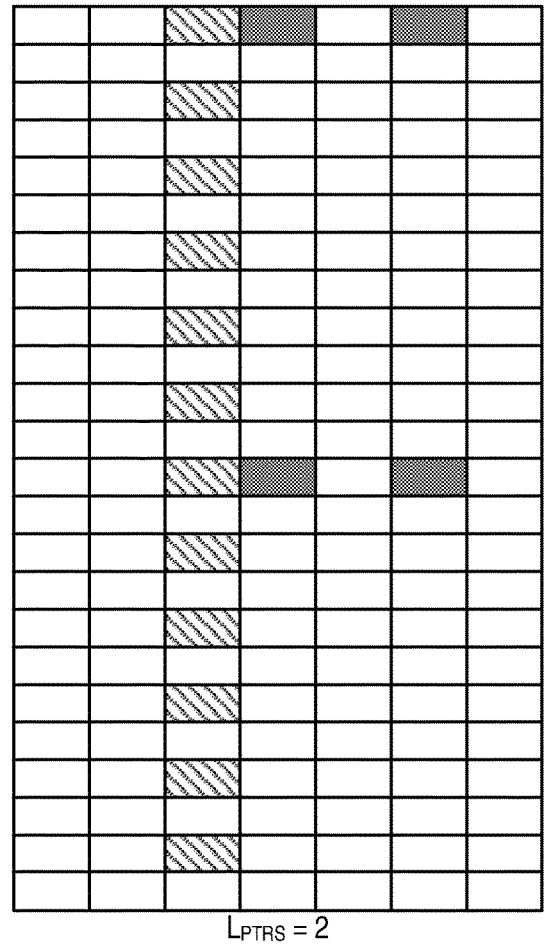

The second factor is that the overhead for PDSCH transmission is associated with the CQI feedback itself. As shown in Table 2, the time density of PTRS is a function of scheduled MCS. As one example, when one CQI index is derived, when the corresponding MCS is larger than ptrs-MCS3, $L_{PT-RS}=1$, the PTRS pattern corresponds to the left pattern indicated in FIG. 3. When the corresponding MCS is smaller than ptrs-MCS3 and larger than ptrs-MCS2, $L_{PT-RS}=2$, the PTRS pattern corresponds to the right pattern indicated in FIG. 3. For different derived MCS, the RS overhead is different. If the gNB and UE have different assumptions on the overhead, the MCS may be not accurate.

Certain aspects of the present disclosure and their embodiments may provide solutions to the aforementioned or other challenges. The present disclosure sets forth the following key proposals:

PTRS density in CSI reference resource is associated with CQI-value and the association can be Radio Resource Control (RRC) configured, or predefined or determined by a predefined rule;

UE-specific reference signal overhead in the CSI reference resource is consistent with one or more of:
  The most recent reported rank for the CSI Report Setting if more than one CSI-RS port is configured, and is consistent with rank 1 transmission if only one CSI-RS port is configured;
  The number of additional DMRS symbols;
  The DMRS configuration type;
  DMRS pattern;
  Presence of reserved resources, e.g. reserved resources for Long Term Evolution (LTE) Cell Specific Reference Signal (CRS);
  the number of OFDM symbols in the CSI reference resource;

UE derives CQI based on a combination of modulation, coding rate and PTRS density and pattern There are, proposed herein, various embodiments which address one or more of the issues disclosed herein.

Certain embodiments may provide one or more of the following technical advantage(s). The advantages of the present disclosure are:

Based on the proposed method, it can avoid the ambiguity of TBS determination; and Based on the proposed method, it can provide more accurate CQI feedback.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 4:
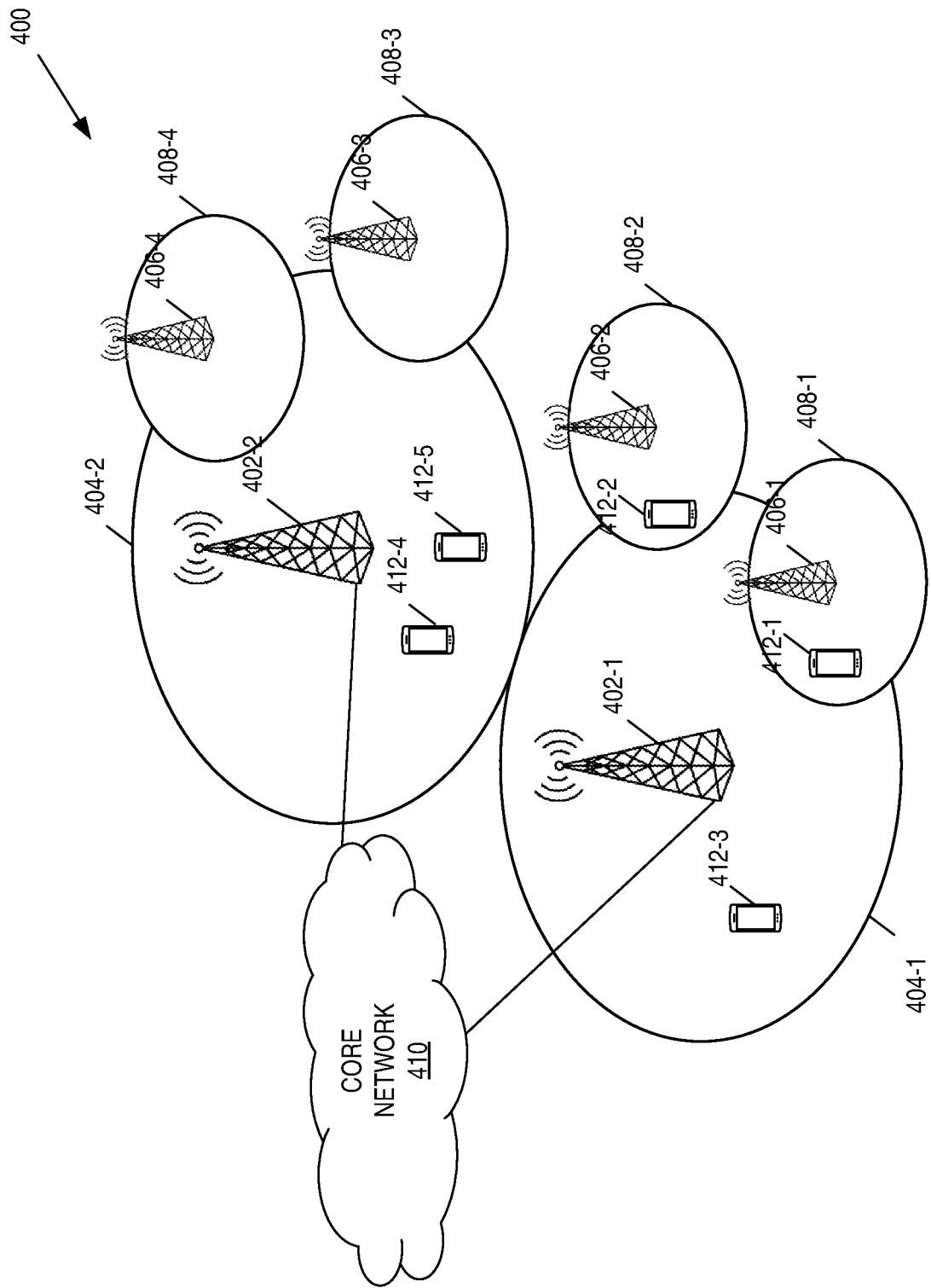
FIG. 4 illustrates one example of a cellular communications network 400 according to some embodiments of the present disclosure.

FIG. 4 illustrates one example of a cellular communications network 400 according to some embodiments of the present disclosure. In the embodiments described herein, the cellular communications network 400 is a 5G NR network. In this example, the cellular communications network 400 includes base stations 402-1 and 402-2, which in 5G NR are referred to as gNBs, controlling corresponding macro cells 404-1 and 404-2. The base stations 402-1 and 402-2 are generally referred to herein collectively as base stations 402 and individually as base station 402, and may also be referred to herein as radio access node 402. Likewise, the macro cells 404-1 and 404-2 are generally referred to herein collectively as macro cells 404 and individually as macro cell 404. The cellular communications network 400 may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The base stations 402 (and optionally the low power nodes 406) are connected to a core network 410.

The base stations 402 and the low power nodes 406 provide service to wireless devices 412-1 through 412-5 in the corresponding cells 404 and 408. The wireless devices 412-1 through 412-5 are generally referred to herein collectively as wireless devices 412 and individually as wireless device 412. The wireless devices 412 are also sometimes referred to herein as UEs.

Exemplary methods for PTRS handling according to embodiments disclosed herein are now discussed. In the first embodiments, PTRS density in CSI reference resource is associated with the selected CQI value. As the first further embodiment, PTRS time density according to the MCS thresholds in DL-PTRS-time-density is assumed, where the ptrs-MCS thresholds are mapped to CQI thresholds. The mapping is high layer configured, or predefined or determined by a predefined rule. As one example, ptrs-MCS1, ptrs-MCS2, ptrs-MCS3, ptrs-MCS4 may be mapped to CQI1, CQI2, CQ3, CQI4 according to Table 4. Thus, the time density of PTRS in the CSI reference resource can be given by Table 5.

In some embodiments, the CQI table comprises 16 entries while the MCS table comprises 32 entries. The MCS table may be constructed such that the entries 1-15 in the CQI table are comprised in the MCS table as well (i.e., there are corresponding entries in the MCS table with the same target code rate and modulation). In that case, in an embodiment, the ptrs-MCS value is implicitly mapped to the corresponding CQI value with the same code rate and modulation, if such an entry exists, or, if such an entry does not exist, the CQI value corresponding to the closest MCS value to ptrs-MCS is used for the mapping.

TABLE 4

CQI value association with MCS threshold in DL-PTRS-time-density

| CQI index | MCS |
|---|---|
| CQI1 | ptrs-MCS1 |
| CQI2 | ptrs-MCS2 |
| CQI3 | ptrs-MCS3 |

TABLE 5

PTRS density assumption in the CSI reference resource associated with CQI index

| Derived CQI index | Time density ($L_{PT\_RS}$) assumption in the CSI reference resource |
|---|---|
| CQI_index < CQI1 | PTRS is not present |
| CQI1 ≤ CQI_index < CQI2 | 4 |
| CQI2 ≤ CQI_index < CQI3 | 2 |
| CQI3 ≤ CQI_index | 1 |

As a second further embodiment of the first embodiment, the CQI index thresholds are configured by higher layer signaling for the PTRS density assumption in the CSI reference resource. According to this embodiment, the gNB can directly signal the information included in Table 5 to the terminal.

As a third further embodiment of the first embodiment, the association of the CQI value to the PTRS density is directly configured in the CQI feedback table. One example is given as Table 6 where the time density the UE shall assume in CQI calculation is indicated in the table; if PTRS is configured for downlink transmission, then the UE shall use this overhead, otherwise the UE shall ignore this overhead when computing CQI. In this example, only the time density is adapted, while the frequency density can be assumed to be fixed overhead, e.g., every second Resource Block (RB), $K_{PTRS}=2$.

TABLE 6

PTRS density assumption for each CQI value which is configured by high layer signaling

| CQI index | modulation | code rate × 1024 | efficiency | PTRS |
|---|---|---|---|---|
| 0 | | out of range | | |
| 1 | QPSK | 78 | 0.1523 | No PTRS |
| 2 | QPSK | 120 | 0.2344 | $L_{PTRS} = 4$ |
| 3 | QPSK | 193 | 0.3770 | $L_{PTRS} = 4$ |
| 4 | QPSK | 308 | 0.6016 | $L_{PTRS} = 4$ |
| 5 | QPSK | 449 | 0.8770 | $L_{PTRS} = 4$ |
| 6 | QPSK | 602 | 1.1758 | $L_{PTRS} = 4$ |
| 7 | 16QAM | 378 | 1.4766 | $L_{PTRS} = 2$ |

TABLE 6-continued

PTRS density assumption for each CQI value
which is configured by high layer signaling

| CQI index | modulation | code rate ×<br>1024 | efficiency | PTRS |
|---|---|---|---|---|
| 8 | 16QAM | 490 | 1.9141 | $L_{PTRS} = 2$ |
| 9 | 16QAM | 616 | 2.4063 | $L_{PTRS} = 2$ |
| 10 | 64QAM | 466 | 2.7305 | $L_{PTRS} = 2$ |
| 11 | 64QAM | 567 | 3.3223 | $L_{PTRS} = 2$ |
| 12 | 64QAM | 666 | 3.9023 | $L_{PTRS} = 1$ |
| 13 | 64QAM | 772 | 4.5234 | $L_{PTRS} = 1$ |
| 14 | 64QAM | 873 | 5.1152 | $L_{PTRS} = 1$ |
| 15 | 64QAM | 948 | 5.5547 | $L_{PTRS} = 1$ |

Figure 5:
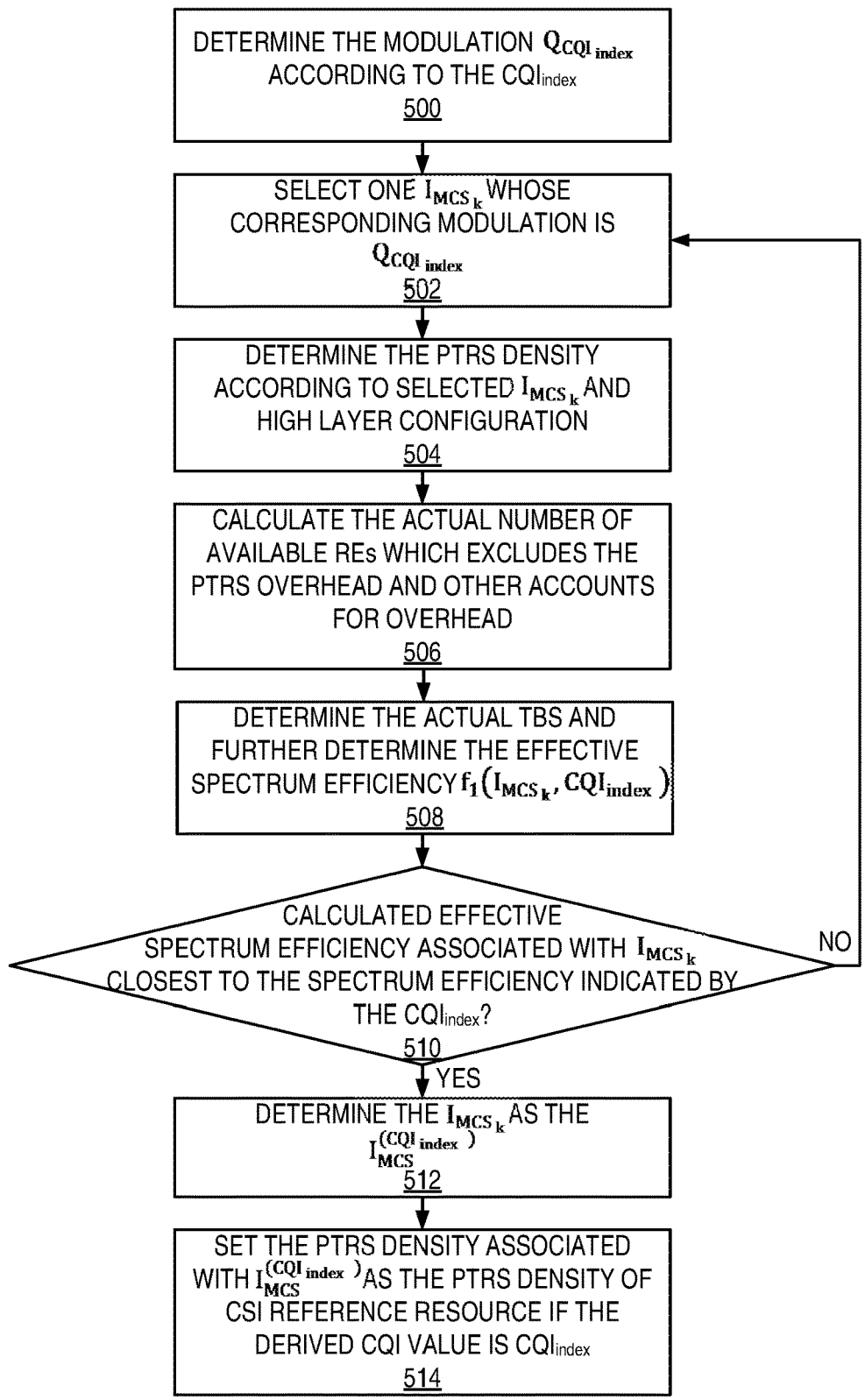
FIG. 5 illustrates one example procedure for determining the PTRS density by the Modulation and Coding Scheme (MCS) value whose corresponding spectrum efficiency, after PTRS overhead is considered, is closest to the spectrum efficiency related to derived Channel Quality Indicator (CQI) value.

As a fourth further embodiment of the first embodiment, the association of PTRS density to the CQI-value is defined according to a predefined rule. As one example for the predefined rule, the PTRS density is determined by the MCS value whose corresponding spectrum efficiency, after PTRS overhead is considered, is closest to the spectrum efficiency related to derived CQI value. One example procedure is illustrated in FIG. 5. To obtain the PTRS density of CSI reference resource, we can first get the MCS value whose corresponding spectrum efficiency, after PTRS overhead is considered, is closest to the spectrum efficiency related to derived CQI value, the MCS values can be given by:

$$I_{MCS}^{(CQI_{index})} = \arg\left(\min_{I_{MCS_k}} (f_3(f_1(I_{MCS_k}, CQI_{index}), f_2(CQI_{index})))\right)$$

where $f_1(\cdot)$, $f_2(\cdot)$, $f_3(\cdot)$ is function, and then set PTRS density in the CSI reference resource for $CQI_{index}$ as the PTRS density associated with $I_{MCS}^{(CQI_{index})}$.

As one example of $f_1(I_{MCS_k}, CQI_{index})$, it can be taken as the spectrum efficiency given $I_{MCS_k}$, $CQI_{index}$ and other related parameters, such as the number of layers, the scheduled resource, accounts for overhead from CSI-RS, CORESET, etc.

As one example function for the $f_2(\cdot)$ can be:

$$f_2(CQI_{index}) = \upsilon * Q_{CQI_{index}} * R_{CQI_{index}}$$

where $Q_{CQI_{index}}$ is the number of bits corresponding to the modulation indicated by CQI index. For example, when 16QAM is indicated, $Q_{CQI_{index}} = 4$. $R_{CQI_{index}}$ is the efficient coding rate indicated by CQI index, and $\upsilon$ is the number of layers. $f_2(CQI_{index})$ can be taken as the efficiency indicated by the CQI index.

As one example for $f_3(f_1(\cdot), f_2(\cdot))$, it can be given by:

$$f_3(f_1(\cdot), f_2(\cdot)) = \text{abs}(f_1(\cdot) - f_2(\cdot))$$

As one example procedure, it can include one or more of the following steps:

Step 500: Determine the modulation $Q_{CQI_{index}}$ according to the $CQI_{index}$ Step 502: Select one $I_{MCS_k}$ whose corresponding modulation is $Q_{CQI_{index}}$ Step 504: Determine the PTRS density according to the selected $I_{MCS_k}$ and the higher layer parameters DL-PTRS-time-density and DL-PTRS-frequency-density Step 506: Calculate the actual number of available REs which excludes the PTRS overhead and other accounts for overhead from CSI-RS, CORESET, DMRS, etc., and further determine the number of resource elements which is determined based on the actual number of available REs, compared with a plurality of reference numbers of REs.

Step 508: Determine the actual TBS and further determine the effective spectrum efficiency for the selected $I_{MCS_k}$ based on one of more of:
  the determined modulation order, $Q_{CQI_{index}}$
  the determined code rate, obtained from the MCS index ($I_{MCS_k}$)
  the determined number of resource elements
  the actual TBS size; the actual TBS size may be associated with one or more of:
    The "intermediate" number of information bits according to the channel coding decisions
    The limitation of the coding rate
    The specific packet sizes (e.g., Voice over Internet Protocol (VoIP))
    Specific services (e.g., Ultra-Reliable and Low Latency Communication (URLLC), etc.)
    Byte alignment
    Code block segmentation Step 510: Check whether the calculated effective spectrum efficiency is closest to the spectrum efficiency indicated by the $CQI_{index}$ Step 512: Determine the $I_{MCS_k}$ as the $I_{MCS}^{(CQI_{index})}$ if the calculated effective spectrum efficiency is closest to the spectrum efficiency indicated by the $CQI_{index}$, otherwise go to Step 502 for a new selected $I_{MCS_k}$ Step 514: Set the PTRS density associated with $I_{MCS}^{(CQI_{index})}$ as the PTRS density of CSI reference resource if the derived CQI value is $CQI_{index}$. In Step 508, the "intermediate" number of information bits can be given by $N_{RE} \cdot \upsilon \cdot Q_m \cdot R$ where
  $\upsilon$ is the number of layers,
  $Q_m$ is the modulation order, obtained from the MCS index
  R is the code rate, obtained from the MCS index
  $N_{RE}$ is number of resource elements
  $N_{RE} = Y * \#PRBs\_scheduled$ When determining $N_{RE}$ (number of REs) within a slot
  Determine $X = 12 * \#OFDM\_symbols\_scheduled - Xd - Xoh$
    $Xd = \#REs\_for\_DMRS\_per\_PRB$ in the scheduled duration
    $Xoh$ = accounts for overhead from CSI-RS, CORESET, etc. One value for uplink, one for downlink
    $Xoh$ is semi-statically determined
  Quantize X into one of a predefined set of values, resulting in Y
    [8] values
      Should allow for reasonable accuracy for all transmission durations
      May depend on the number of scheduled symbols
    Quantization may include applying floor, ceiling, or some other restriction on the value of X
    Quantization may not be needed in some embodiments
    Some embodiments may provide that the quantization step should ensure the same Transport Block Size (TBS) can be obtained between transmission and retransmission, irrespective of the number of layers used for the retransmission. Otherwise, Xd must be independent of the number of layers.

As another alternative for the Step 506 and Step 508, the spectrum efficiency is approximated by $$f_1(I_{MCS_k}, CQI_{index}) = v * Q_{I_{MCS_k}} * R_{I_{MCS_k}},$$

where $$Q_{I_{MCS_k}}$$

is the modulation order, obtained from the MCS index ($I_{MCS_k}$)

$$R_{I_{MCS_k}}$$

is the determined code rate, obtained from the MCS index ($I_{MCS_k}$)

In the second embodiment, in CSI reference resource, PTRS density is assumed as the first PTRS density when DL-PTRS-time-density and DL-PTRS-frequency-density are configured by RRC and is assumed as the second PTRS density when DL-PTRS-time-density and DL-PTRS-frequency-density are not configured. In the second embodiment, the first PTRS density may be the same as the second PTRS density. As one example for the first PTRS density, it can be assumed as L_PTRS=1 and K_PTRS=2 when DL-PTRS-time-density and DL-PTRS-frequency-density are configured by RRC. As one example for the second PTRS density, PTRS is assumed to be present in every OFDM symbol and every second PRB, as what is the default case if DL-PTRS-time-density and DL-PTRS-frequency-density is not configured. If DL-PTRS-present is not configured, the UE assumes that no resource elements in the CSI reference resource are used for PTRS.

Figure 6:
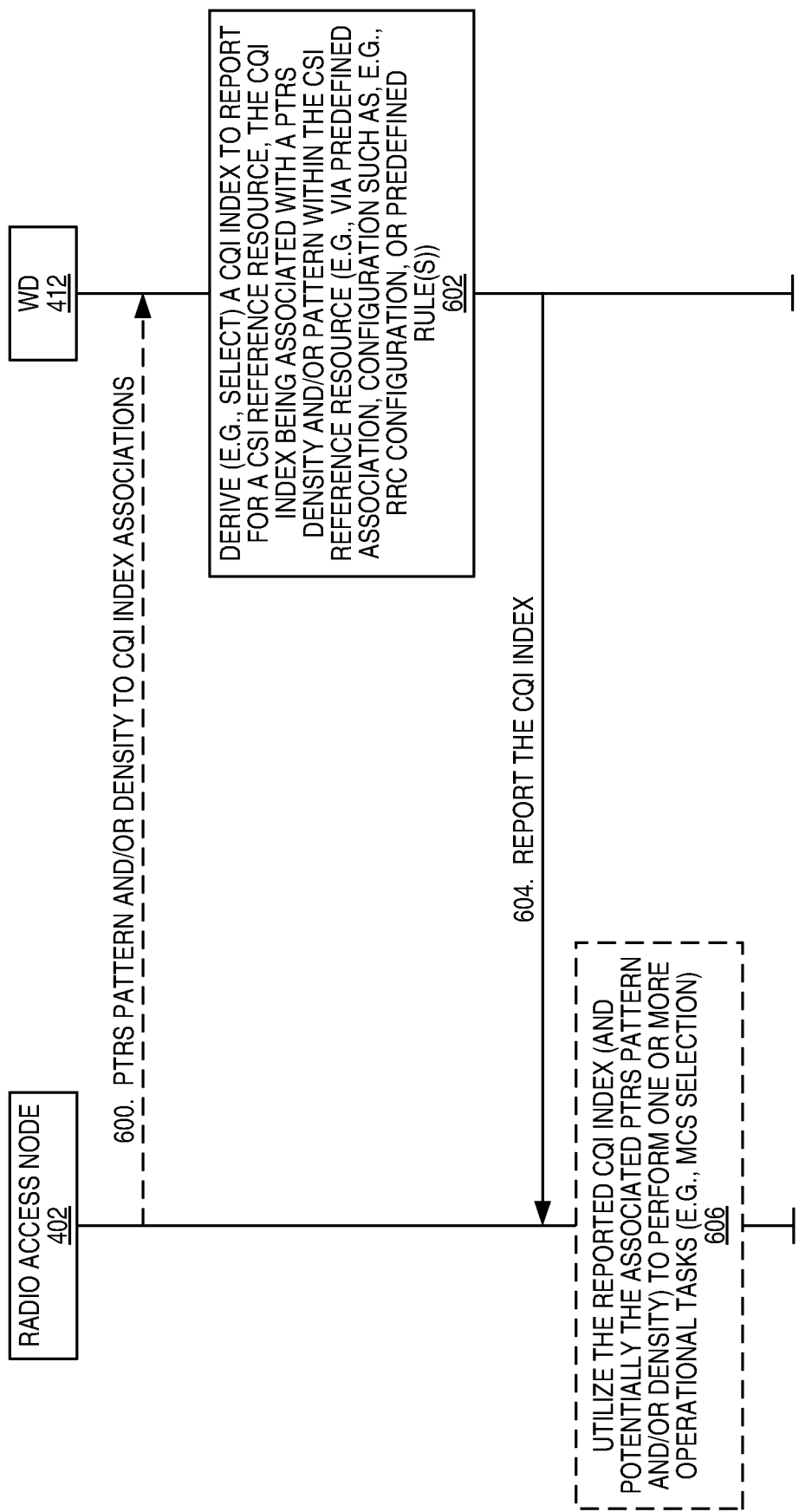
FIG. 6 illustrates the operation of a radio access node and a wireless device according to some embodiments of the present disclosure.

FIG. 6 illustrates the operation of a radio access node 402 and a wireless device 412 according to at least some of the embodiments described above. Note that this process is equally applicable to the low power node 406. Optional steps are represented by dashed lines. As illustrated, the radio access node 402 optionally configures one or more, but preferably multiple, PTRS patterns and/or density to CQI index associations for the wireless device 412 (step 600). In some embodiments, this is done via RRC configuration, but is not limited thereto.

The wireless device 412 derives (e.g., selects) a CQI index to report for a CSI reference resource, where the CQI index is associated with a PTRS density and/or pattern within the CSI reference resource (step 602). In some embodiments, known associations between multiple CQI index values and PTRS densities and/or patterns for those CQI index values are used by the wireless device 412 when selecting the CQI index to report to the radio access node 402. For example, the CQI index derivation procedure may take into account overhead in the CSI reference resource, where this overhead includes PTRS and the PTRS density and/or the pattern in the CSI reference resource varies between CQI index values. For any particular CQI index, the overhead due to PTRS can be determined based on the associated PTRS density and/or pattern.

The association between the CQI index and the PTRS density and/or pattern may be determined, e.g., in accordance with any of the embodiments described above. For example, in some embodiments, the association between the CQI index and the PTRS density and/or pattern is predefined, e.g., via an appropriate standard. In some other embodiments, the association between the CQI index and the PTRS density and/or pattern is configured, e.g., via a network node such as, e.g., the radio access node 402. In some other embodiments, the association between the CQI index and the PTRS density and/or pattern is determined by the wireless device 412 based on one or more predefined rules, e.g., as described above with respect to FIG. 5.

The wireless device 412 reports the derived CQI index to the radio access node 402, where again the CQI index is associated with the corresponding PTRS density and/pattern (step 604). The association between the CQI index and the PTRS density and/or pattern is known or can be determined by the radio access node 402. In this manner, the radio access node 402 and the wireless device 412 have a common understanding of the PTRS density and/or pattern in the CSI reference resource. Optionally, the radio access node 402 utilizes the reported CQI index and potentially the associated PTRS pattern and/or density for one or more operational tasks (e.g., MCS selection for a downlink grant to the wireless device 412) (step 606).

Exemplary methods for DMRS handling in the CSI reference resource according to some embodiments disclosed herein are now discussed. Note that these methods for DMRS handling in the CSI reference resource may, in some embodiments, be combinable with the methods for PTRS handling described above.

In one embodiment, the UE-specific reference signal overhead in the CSI reference resource is consistent with one or more of:
  The most recent reported rank for the CSI Report Setting if more than one CSI-RS port is configured, and is consistent with rank 1 transmission if only one CSI-RS port is configured
  The number of additional DMRS symbols
  The DMRS configuration types
  DMRS pattern
  The reserved resources configured to the UE, for example, to allow for transmission of LTE CRS without interfering with NR, in case the NR frequency band overlaps with a LTE frequency band
  The number of OFDM symbols in the CSI reference resource
  The semi-statically configured (if configured) slot formats, e.g. if slots have 10 downlink symbols and four uplink symbols, to allow for very fast Hybrid Automatic Repeat Request (HARQ) Acknowledgement (ACK) feedback in the same slot as the PDSCH, then the CSI reference resource could take into account the number of available PDSCH symbols in a slot or the average number of configured PDSCH symbols in a slot, where the average is taken over a time period such as a frame or a set of multiple frames (e.g., corresponding to the periodicity of the semi-static slot format indication, e.g., 40 milliseconds (ms), 80 ms, etc.)

When the UE-specific reference signal overhead in the CSI reference resource is consistent with the number of additional DMRS symbols, it can be aligned with the higher layer configured additional DMRS symbols for PDSCH transmission, and/or it can also use separate signaling to configure the number of additional DMRS symbols in the CSI reference resource. When it is configured by high layer signaling, the UE may assume that the number of higher layer configured additional DMRS symbols are taken into account in the CSI reference resource. It can also be predefined. For example, as default, only one front-loaded OFDM symbol is assumed in the CSI reference resource. As one example for the predefined rule, the UE assumes a single symbol front loaded DMRS symbol for RI=1-4 and two symbol front loaded DMRS symbols for RI=5-8. It can also be determined by predefined rule. The rule can be aligned with the DMRS symbols determination for actual PDSCH transmission.

When the UE-specific reference signal overhead in the CSI reference resource is consistent with DMRS configuration types, it can be aligned with the RRC configured for actual used DMRS in PDSCH transmission, and/or it can also be configured by separate RRC signaling for the DMRS configuration type used in CSI reference resource, and it can also be predefined.

When the UE-specific reference signal overhead in the CSI reference resource is consistent with the DMRS pattern, it can be one or more of the following:
 can be aligned with which is indicated in the latest received downlink control indicator
 can be configured as RRC signaling
 can be predefined
 can be decided according a predefined rule When the DMRS pattern is aligned with which is indicated in the latest received downlink control indicator, it includes that the overhead assumption for the latest PDSCH transmission can be assumed to be the overhead assumption in the CSI reference resource. As one example, when RI=2, the overhead for DMRS is assumed to be equal to one "comb" if the antenna ports are mapping into only one "comb" in the latest received downlink control indicator, and the overhead for DMRS is assumed to be equal to two "comb" if the antenna ports are mapping into two "comb." It can be predefined, RRC configured, or determined according to predefined rule to decide the pattern. If it is predefined, the DMRS pattern is fixed regardless of the DCI scheduling. If it is RRC configured, the DMRS pattern in CSI reference resource is decided according to RRC configuration. If a predefined rule, the DMRS pattern can be derived based on the rule. As one example of the rule, the DMRS pattern used for SU-MIMO is also applied to Multi User Multiple Input Multiple Output (MU-MIMO) cases.

When the most recent reported rank is changed, and there are no reference DMRS patterns, the DMRS pattern may be configured by RRC signaling, predefined, or determined according to a predefined rule. As one example of a predefined rule, the layer mapping to comb(s) in the latest received downlink control indicator can be used for any rank.

When the UE-specific reference signal overhead in the CSI reference resource is consistent with the number of OFDM symbols in the CSI reference resource, it can be the number of OFDM symbols used in the corresponding valid downlink subframe related to the CSI reference resource. It can also be configured by RRC signaling. It can also be predefined or determined according to a predefined rule. In some embodiments, the number of OFDM symbols in the CSI reference resource is RRC configured for each CSI report setting, i.e. it is part of the ReportConfig IE. This allows the gNB to dynamically change the CSI reference resource assumption used by the UE for CQI calculation, by triggering different aperiodic CSI reports. For instance, one CSI report setting may use all OFDM symbols in the slot as the CSI reference resource while another CSI report setting may use a smaller number of OFDM symbols, such as four symbols. Such a configuration may be appropriate if the gNB intends to schedule the UE with non-slot based scheduling.

Figure 7:
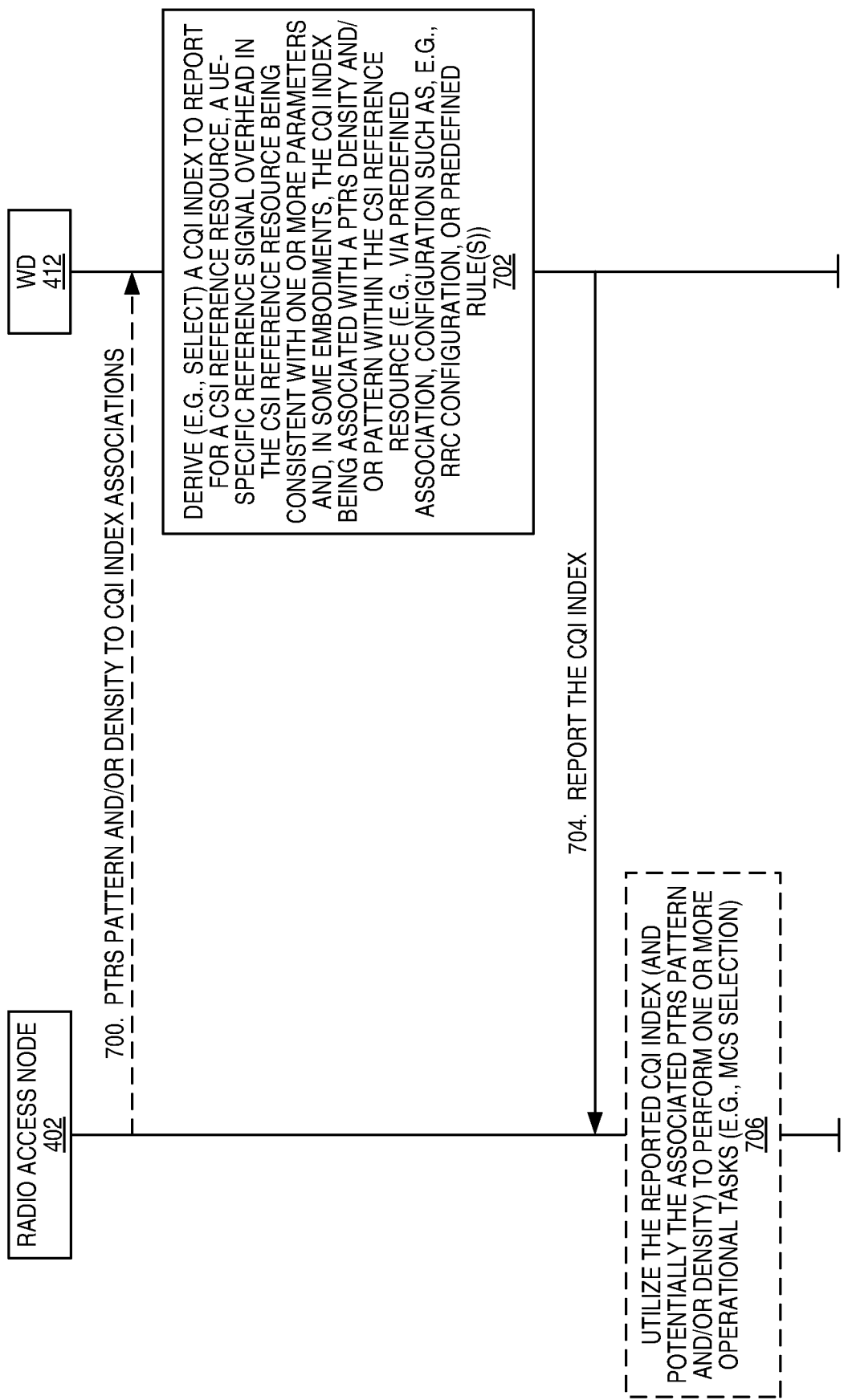
FIG. 7 illustrates the operation of a radio access node and a wireless device according to other embodiments of the present disclosure.

FIG. 7 illustrates the operation of a radio access node 402 and a wireless device 412 according to at least some of the embodiments described above. Note that this process is equally applicable to the low power node 406. Optional steps are represented by dashed lines. As illustrated, the radio access node 402 optionally configures one or more, but preferably multiple, PTRS patterns and/or density to CQI index associations for the wireless device 412 (step 700). In some embodiments, this is done via RRC configuration, but is not limited thereto.

The wireless device 412 derives (e.g., selects) a CQI index to report for a CSI reference resource (step 702). In other words, as will be appreciated by one of skill in the art, the wireless device 412 derives the CQI index (desired modulation and coding scheme) assuming a hypothetical PDSCH transmission on a (also hypothetical) CSI reference resource. In some embodiments, the CQI index is associated with a PTRS density and/or pattern within the CSI reference resource, as described above. Further, in this embodiment, a UE-specific reference signal (e.g., DMRS) overhead in the CSI reference resource is consistent with one or more parameters (e.g., the most recent reported rank for the CSI report setting (i.e., CSI process in LTE terminology), the number of additional DMRS symbols, the DMRS configuration type(s), DMRS pattern(s), reserved resources configured for the wireless device 412, the number of OFDM symbols in the CSI reference resource, and/or semi-statically configured slot format(s)), as described above, and is used by the wireless device 412 when selecting the CQI index to report to the radio access node 402. In some embodiments, the wireless device 412 also uses the associations between CQI index values and PTRS densities and/or patterns when selecting the CQI index to report, as described above. For example, the CQI index derivation procedure may take into account overhead in the CSI reference resource, where this overhead includes UE-specific reference signals and PTRS. The overhead due to the UE-specific reference signals (e.g., DMRS) can be determined by the wireless device 412 as described above. In addition, in some embodiments, the overhead due to PTRS in the CSI reference resource can be determined by the wireless device 412, as described above.

The wireless device 412 reports the derived CQI index to the radio access node 402, where again the CQI index is associated with the corresponding PTRS density and/pattern (step 704). The association between the CQI index and the PTRS density and/or pattern is known or can be determined by the radio access node 402. In this manner, the radio access node 402 and the wireless device 412 have a common understanding of the PTRS density and/or pattern in the CSI reference resource. Optionally, the radio access node 402 utilizes the reported CQI index and potentially the associated PTRS pattern and/or density for one or more operational tasks (e.g., MCS selection for a downlink grant to the wireless device 412) (step 706).

Exemplary methods for CQI determination according to some embodiments disclosed herein are now discussed. At terminal side, the methods for CQI determination includes one or more of:
 Selecting one MCS index
 Obtaining the PTRS pattern and density according to the selected MCS index Determining PDSCH performance given the selected MCS index and the determined PTRS pattern and density Checking the PDSCH performance whether a given performance is satisfied Upon checking results, if the PDSCH performance satisfies the given performance, the MCS index is selected as the input for the further CQI derivation, otherwise, repeating the above steps until the PDSCH performance satisfy the given performance Deriving the CQI based on the selected MCS which satisfy the given performance For methods for CGI determination that include checking the PDSCH performance to determine whether a given performance is satisfied, it includes checking the BLER performance and/or spectrum efficiency performance and/or latency requirements. The performance metric is not limited to the above performance, and the other performance can also be used here. The BLER target may be given by high layer signaling or predefined for specific service or determined based on a predefined rule. If the BLER of PDSCH is smaller than the given threshold, it can be called BLER performance is satisfied. For spectrum efficiency performance, the requirements to be called spectrum efficiency are satisfied when BLER or latency requirements are satisfied and maximum spectrum efficiency is achieved.

As one embodiment, deriving the CQI based on the selected MCS which satisfies the given performance requirements includes selecting the CQI value which has the closest actual spectrum efficiency as the selected MCS. The actual spectrum efficiency will consider the byte alignment, number of available REs quantization, channel coding size adaptation, etc.

As another embodiment, deriving the CQI based on the selected MCS which satisfies the given performance requirements includes selecting the CQI value whose $Q_{I_{MCS}} \cdot R_{I_{MCS}}$ is closest to the $Q_{CQI_{index}} \cdot R_{CQI_{index}}$ which is indicated by the CQI index, $Q_{I_{MCS}}$ and $R_{I_{MCS}}$ are obtained by the MCS index.

Figure 8:
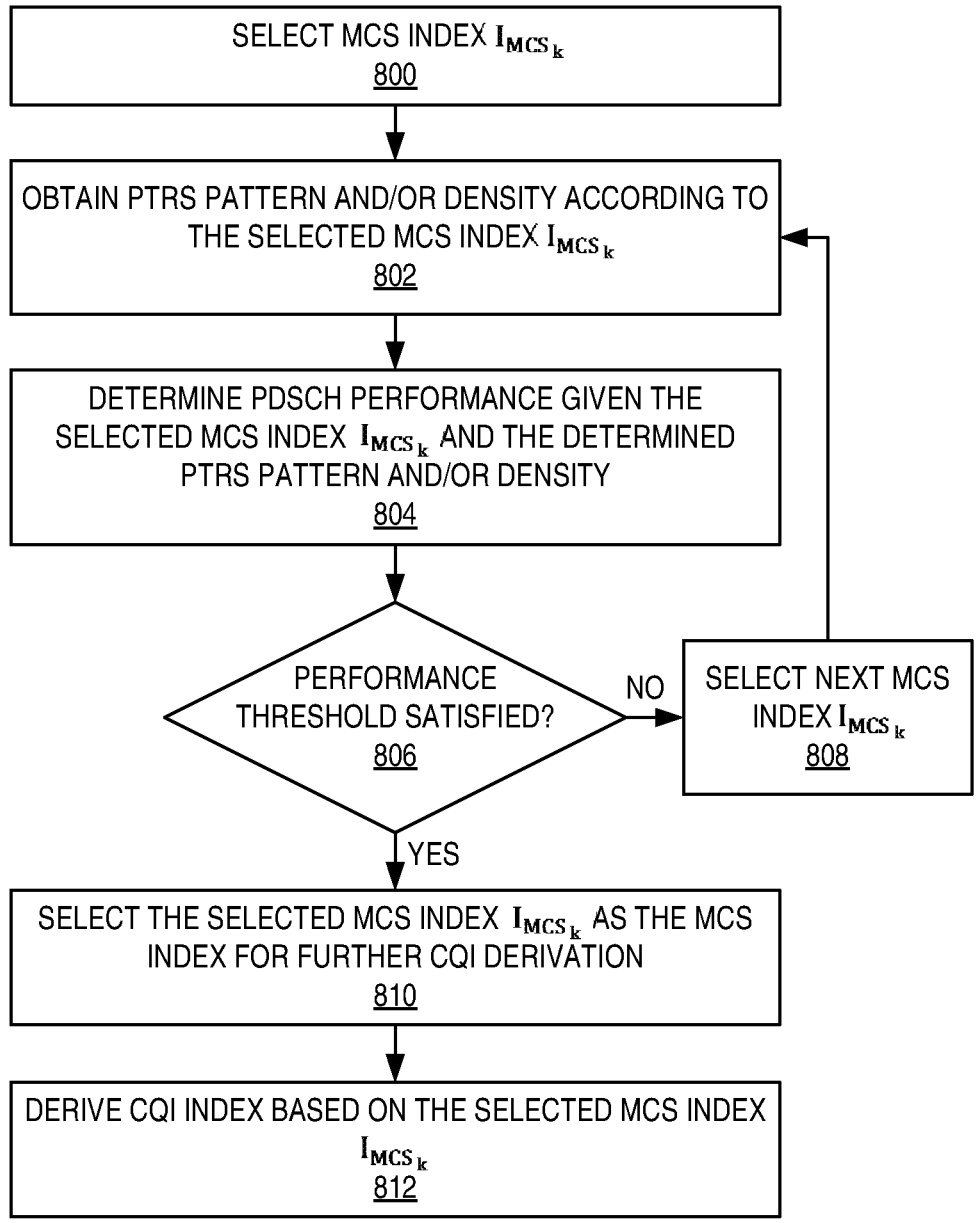
FIG. 8 illustrates a flow chart illustrating one example of a CQI index derivation procedure according to some embodiments of the present disclosure.

FIG. 8 is a flow chart that illustrates one example of the CQI index derivation procedure described above. As illustrated, the wireless device 412 selects an MCS index $I_{MCS_k}$ (step 800) and obtains a PTRS pattern and/or density according to the selected MCS index $I_{MCS_k}$ (step 802). In this embodiment, there is a known association between MCS index values and PTRS patterns and/or densities. These associations may be predefined (e.g., by standard), configured by the network (e.g., via RRC signaling), or determined by the wireless device 412 based on a predefined rule(s). The wireless device 412 determines a PDSCH performance given the selected MCS index $I_{MCS_k}$ and the determined PTRS pattern and/or density (step 804). As described above, in some embodiments, the PDSCH performance includes BLER and/or spectrum efficiency and/or latency. However, the PDSCH performance is not limited to these performance metrics. Any suitable performance metric may be used.

The wireless device 412 determines whether the determined PDSCH performance satisfies a predefined or pre-configured threshold PDSCH performance (step 806). If not, the wireless device 412 selects a new MCS index $I_{MCS_k}$ (step 808) and the process returns to step 802. Once the PDSCH performance, given the selected MCS index $I_{MCS_k}$ and the determined PTRS pattern and/or density for the selected MCS index $I_{MCS_k}$, satisfies the performance threshold, the wireless device 412 selects that particular selected MCS index $I_{MCS_k}$ as the MCS index for further CQI derivation (step 810). The wireless device 412 then derives the CQI index to be reported to the network based on the selected MCS index $I_{MCS_k}$ (step 812). While not illustrated, in some embodiments, the wireless device 412 reports the derived CQI index to the network (e.g., to a radio access node 402 or low power node 406).

Figure 9:
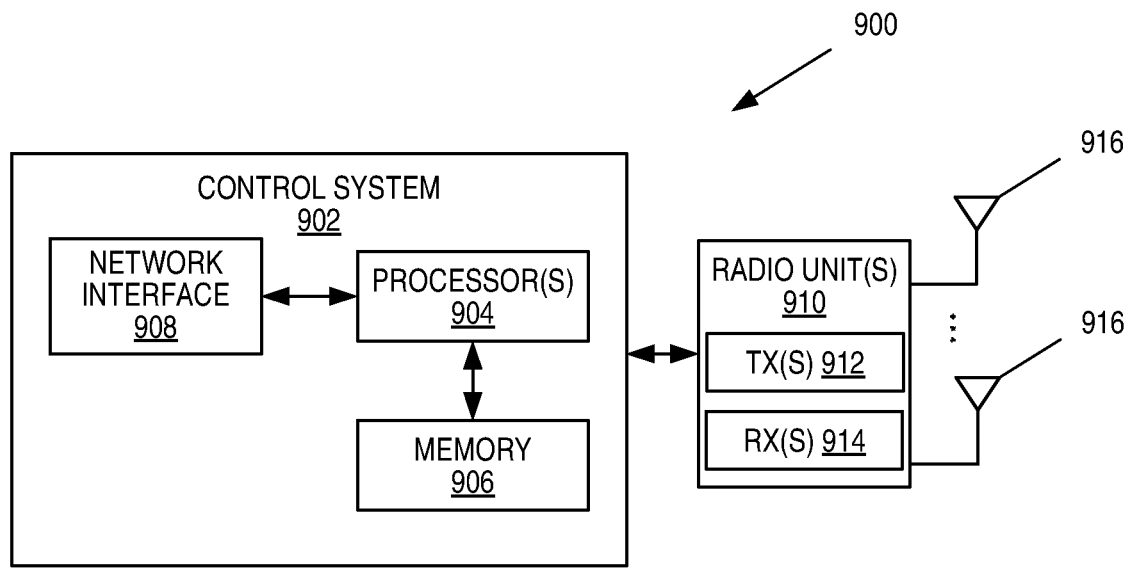
FIG. 9 illustrates a schematic block diagram of a radio access node according to some embodiments of the present disclosure.

Example embodiments of a radio access node and a wireless device according to some embodiments disclosed herein are now discussed. In this regard, FIG. 9 is a schematic block diagram of a radio access node 900 according to some embodiments of the present disclosure. The radio access node 900 may be, for example, a base station 402 or low power node 406. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. In addition, the radio access node 900 includes one or more radio units 910 that each includes one or more transmitters 912 and one or more receivers 914 coupled to one or more antennas 916. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

Figure 10:
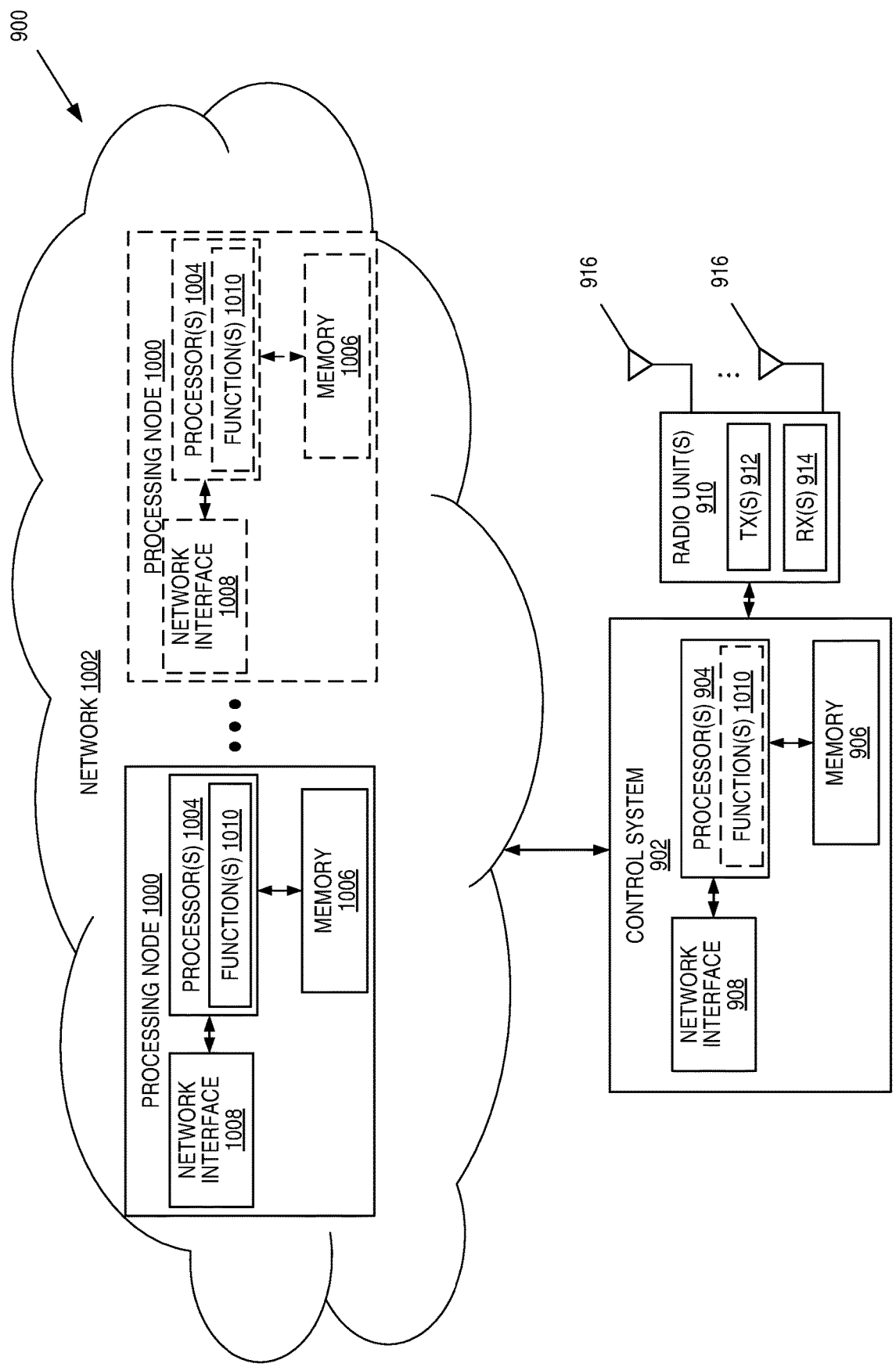
FIG. 10 illustrates a schematic block diagram of a virtualized embodiment of the radio access node 900 according to some embodiments of the present disclosure.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 includes the control system 902 that includes the one or more processors 904 (e.g., CPUs, ASICs, FPGAs, and/or the like), the memory 906, the network interface 908, and the one or more radio units 910 that each includes the one or more transmitters 912 and the one or more receivers 914 coupled to the one or more antennas 916, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), a memory 1006, and a network interface 1008.

In this example, functions 1010 of the radio access node 900 described herein are implemented at the one or more processing nodes 1000 or distributed across the control system 902 and the one or more processing nodes 1000 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicates directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
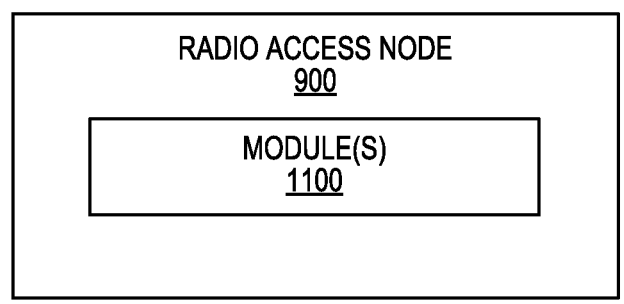
FIG. 11 illustrates a schematic block diagram of a radio access node according to other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the module(s) 1100 may be implemented at one of the processing node(s) 1000 or distributed across multiple processing node(s) 1000 and/or distributed across the processing node(s) 1000 and the control system 902.

Figure 12:
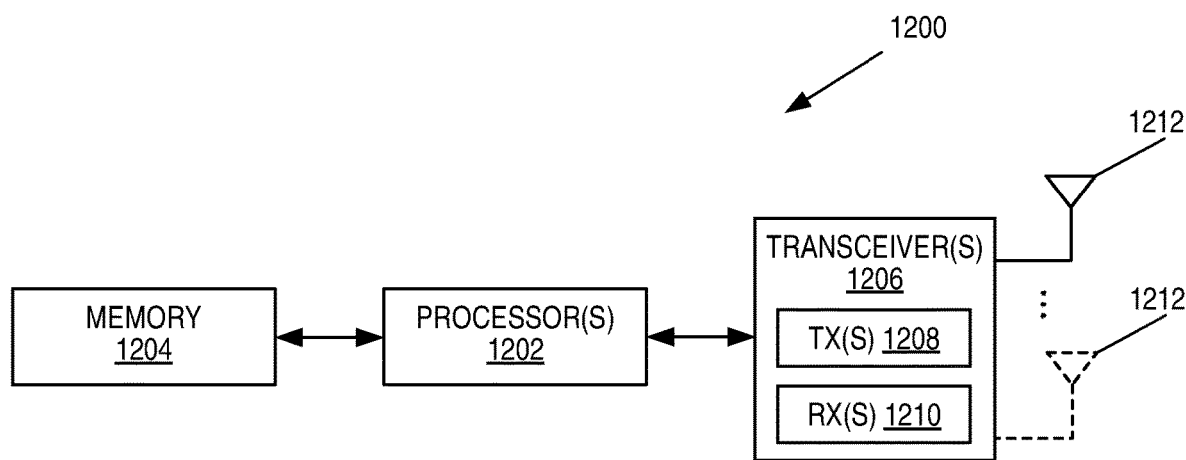
FIG. 12 illustrates a schematic block diagram of a User Equipment (UE) according to some embodiments of the present disclosure.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), a memory 1204, and one or more transceivers 1206, each including one or more transmitters 1208 and one or more receivers 1210 coupled to one or more antennas 1212. In some embodiments, the functionality of the UE 1200 described above may be fully or partially implemented in software that is, e.g., stored in the memory 1204 and executed by the processor(s) 1202.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
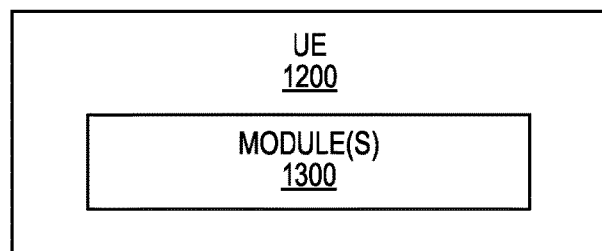
FIG. 13 illustrates a schematic block diagram of a UE according to other embodiments of the present disclosure.

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Figure 14:
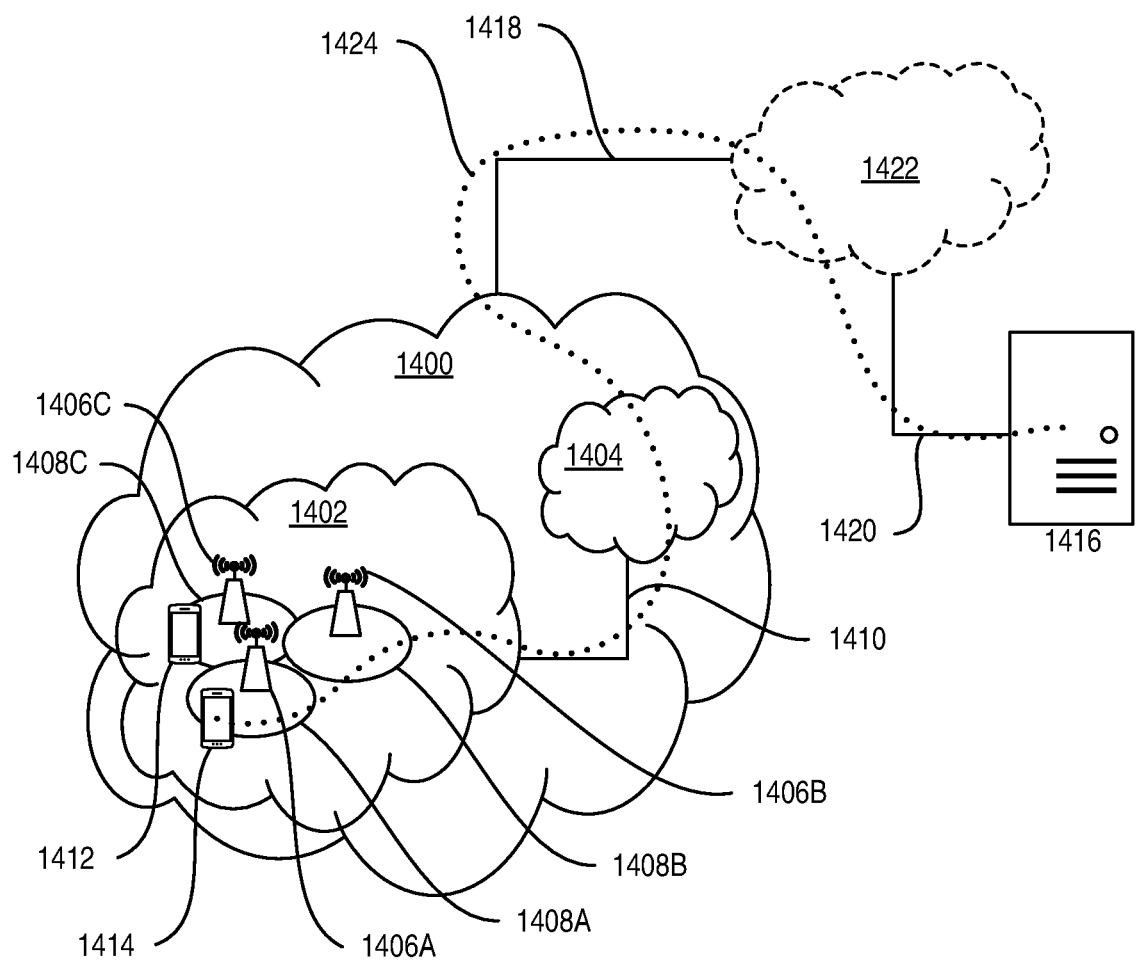
FIG. 14 illustrates a communication system including a telecommunication network according to some embodiments of the present disclosure.

With reference to FIG. 14, in accordance with an embodiment, a communication system includes a telecommunication network 1400, such as a 3GPP-type cellular network, which comprises an access network 1402, such as a Radio Access Network (RAN), and a core network 1404. The access network 1402 comprises a plurality of base stations 1406A, 1406B, 1406C, such as NBs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
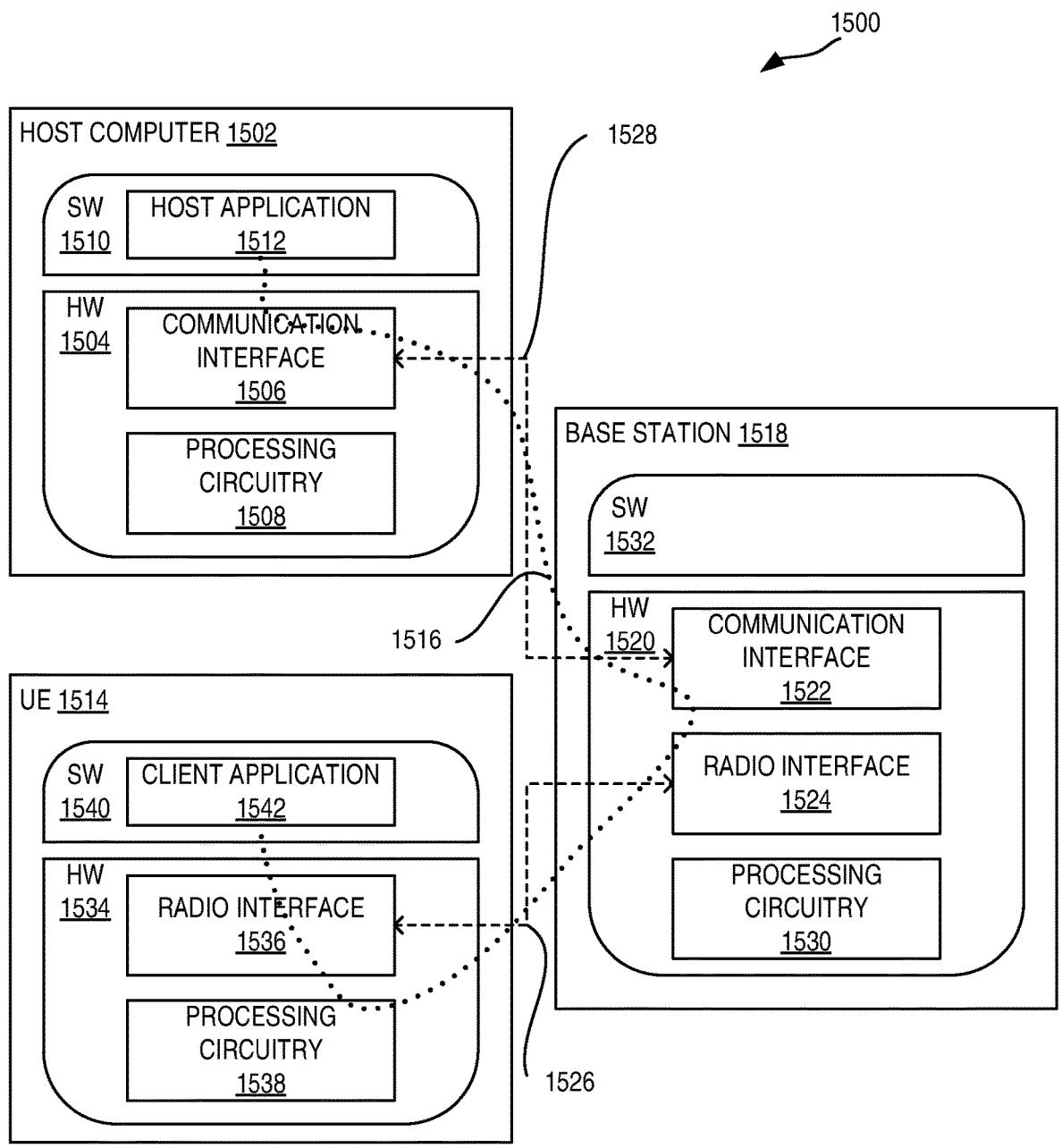
FIG. 15 illustrates example implementations of a UE, base station, and host computer according to some embodiments of the present disclosure.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both.

While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve, e.g., date rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1518, and it may be unknown or imperceptible to the base station 1518. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

While not being limited thereto, some example embodiments of the present disclosure are provided below.

Embodiment 1

A method performed by a wireless device for CQI index reporting in a wireless communication system, the method comprising:
  deriving a CQI index to be reported to a network node for a CSI reference resource, the CQI index being associated with a PTRS density and/or pattern within the CSI reference resource; and
  reporting the CQI index to the network node.

Embodiment 2

The method of embodiment 1 wherein the CQI index is associated with the PTRS density and/or pattern via a configuration (e.g., an RRC configuration).

Embodiment 3

The method of embodiment 1 wherein the CQI index is associated with the PTRS density and/or pattern via a predefined association (e.g., standard).

Embodiment 4

The method of embodiment 1 wherein the CQI index is associated with the PTRS density and/or pattern via a predefined rule.

Embodiment 5

The method of any one of embodiments 1 to 4 wherein deriving the CQI index to be reported comprises deriving the CQI index to be reported based on the PTRS density and/or pattern associated with the CQI index.

Embodiment 6

The method of any one of embodiments 1 to 4 wherein deriving the CQI index to be reported comprises deriving the CQI index to be reported based on a plurality of PTRS densities and/or patterns associated with a plurality of CQI indices.

Embodiment 7

The method of any one of embodiments 1 to 6 wherein the CQI index is one of a plurality of CQI indices and at least two of the plurality of CQI indices are associated with different PTRS densities and/or patterns.

Embodiment 8

A method performed by a wireless device for CQI index reporting in a wireless communication system, the method comprising:
  deriving a CQI index to be reported to a network node for a CSI reference resource, wherein a wireless device-specific reference signal overhead in the CSI reference resource is consistent with one or more parameters; and
  reporting the CQI index to the network node.

Embodiment 9

The method of embodiment 8 wherein the wireless device-specific reference signal overhead in the CSI reference resource is consistent with:
  a most recent reported rank for a respective CSI process;
  a number of additional DMRS symbols;
  a DMRS pattern;
  reserved resources configured for the wireless device;
  a number of OFDM symbols in the CSI reference resource; and/or
  a semi-statically configured slot-format.

Embodiment 10

The method of embodiment 8 or 9 wherein the CQI index is associated with a PTRS density and/or pattern within the CSI reference resource.

Embodiment 11

The method of embodiment 10 wherein the CQI index is associated with the PTRS density and/or pattern via a configuration (e.g., an RRC configuration).

Embodiment 12

The method of embodiment 10 wherein the CQI index is associated with the PTRS density and/or pattern via a predefined association (e.g., standard).

Embodiment 13

The method of embodiment 10 wherein the CQI index is associated with the PTRS density and/or pattern via a predefined rule.

Embodiment 14

The method of any one of embodiments 8 to 13 wherein deriving the CQI index to be reported comprises deriving the CQI index to be reported based on:
  the wireless device-specific reference signal overhead in the CSI reference resource; and
  PTRS overhead in the CSI reference resource, wherein the PTRS overhead in the CSI reference resource varies for different CQI indices in accordance with PTRS densities and/or patterns associated with the different CQI indices.

Embodiment 15

The method of any one of embodiments 8 to 14 wherein the CQI index is one of a plurality of CQI indices and at least two of the plurality of CQI indices are associated with different PTRS densities and/or patterns.

Embodiment 16

A method performed by a wireless device for deriving a CQI index to be reported by the wireless device in a wireless communication system, the method comprising:
  selecting an MCS index;
  obtaining a PTRS pattern and/or density according to the MCS index;
  determining a physical downlink channel performance given the MCS index and the PTRS pattern and/or density;
  determining whether the physical downlink channel performance satisfies a predefined or preconfigured performance threshold; and
  if the determined physical downlink channel performance satisfies the predefined or preconfigured performance threshold:
    selecting the MCS index as a MCS index for further CQI index derivation; and
    deriving a CQI index to be reported by the wireless device based on the MCS index selected for further CQI index derivation.

Embodiment 17

The method of embodiment 16 further comprising, if the determined physical downlink channel performance does not satisfy the predefined or preconfigured performance threshold:
  selecting a second MCS index;
  obtaining a second PTRS pattern and/or density according to the second MCS index;
  determining a second physical downlink channel performance given the second MCS index and the second PTRS pattern and/or density;
  determining whether the second physical downlink channel performance satisfies the predefined or preconfigured performance threshold; and
  if the second physical downlink channel performance satisfies the predefined or preconfigured performance threshold:
    selecting the second MCS index as the MCS index for further CQI index derivation; and
    deriving the CQI index to be reported by the wireless device based on the MCS index selected for further CQI index derivation.

Embodiment 18

The method of any of the previous embodiments, further comprising:
  providing user data; and
  forwarding the user data to a host computer via a transmission to a radio access node.

Embodiment 19

A method performed by a radio access node for CQI index reporting in a wireless communication system, the method comprising:
  receiving a reported CQI index from a wireless device for a CSI reference resource, the reported CQI index being associated with a PTRS density and/or pattern within the CSI reference resource.

Embodiment 20

The method of embodiment 19 wherein the reported CQI index is associated with the PTRS density and/or pattern via a configuration (e.g., an RRC configuration).

Embodiment 21

The method of embodiment 19 wherein the reported CQI index is associated with the PTRS density and/or pattern via a predefined association (e.g., standard).

Embodiment 22

The method of embodiment 19 wherein the reported CQI index is associated with the PTRS density and/or pattern via a predefined rule.

Embodiment 23

The method of any one of embodiments 19 to 22 wherein the reported CQI index one of a plurality of CQI indices and at least two of the plurality of CQI indices are associated with different PTRS densities and/or patterns.

Embodiment 24

A method performed by a radio access node for CQI index reporting in a wireless communication system, the method comprising:
  receiving a reported CQI index from a wireless device for a CSI reference resource, wherein a wireless device-specific reference signal overhead in the CSI reference resource is consistent with one or more parameters.

Embodiment 25

The method of embodiment 24 wherein the wireless device-specific reference signal overhead in the CSI reference resource is consistent with:
  a most recent reported rank for a respective CSI process;
  a number of additional DMRS symbols;
  a DMRS pattern;
  reserved resources configured for the wireless device;
  a number of OFDM symbols in the CSI reference resource; and/or
  a semi-statically configured slot-format.

Embodiment 26

The method of embodiment 24 or 25 wherein the reported CQI index is associated with a PTRS density and/or pattern within the CSI reference resource.

Embodiment 27

The method of embodiment 26 wherein the reported CQI index is associated with the PTRS density and/or pattern via a configuration (e.g., an RRC configuration).

Embodiment 28

The method of embodiment 26 wherein the reported CQI index is associated with the PTRS density and/or pattern via a predefined association (e.g., standard).

Embodiment 29

The method of embodiment 26 wherein the reported CQI index is associated with the PTRS density and/or pattern via a predefined rule.

Embodiment 30

The method of any one of embodiments 24 to 29 wherein the reported CQI index one of a plurality of CQI indices and at least two of the plurality of CQI indices are associated with different PTRS densities and/or patterns.

Embodiment 31

The method of any of the previous embodiments, further comprising:
  obtaining user data; and
  forwarding the user data to a host computer or the wireless device.

Embodiment 32

A wireless device for a wireless communication system, the wireless device comprising:
  a radio interface comprising at least one transmitter and at least one receiver; and
  processing circuitry configured to perform any of the steps of any of Embodiments 1 to 18.

Embodiment 33

A radio access node for a wireless communication system, the radio access node comprising:
  a network interface and/or a radio interface comprising at least one transmitter and at least one receiver; and
  processing circuitry configured to perform any of the steps of any of Embodiments 19 to 31.

Embodiment 34

A wireless device for a wireless communication system, the wireless device comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of Embodiment 1 to 18;
  an input interface connected to the processing circuitry and configured to allow input of information into the wireless device to be processed by the processing circuitry;
  an output interface connected to the processing circuitry and configured to output information from the wireless device that has been processed by the processing circuitry; and a battery connected to the processing circuitry and configured to supply power to the wireless device.

Embodiment 35

A communication system including a host computer comprising:
processing circuitry configured to provide user data; and
a communication interface configured to forward the user data to a cellular network for transmission to a wireless device;
wherein the cellular network comprises a radio access node having a radio interface and processing circuitry, the radio access node's processing circuitry configured to perform any of the steps of any of Embodiments 19 to 31.

Embodiment 36

The communication system of the pervious embodiment further including the radio access node.

Embodiment 37

The communication system of the previous 2 embodiments, further including the wireless device, wherein the wireless device is configured to communicate with the radio access node.

Embodiment 38

The communication system of the previous 3 embodiments, wherein:
the processing circuitry of the host computer is configured to execute a host application, thereby providing the user data; and
the wireless device comprises processing circuitry configured to execute a client application associated with the host application.

Embodiment 39

A method implemented in a communication system including a host computer, a radio access node, and a wireless device, the method comprising:
at the host computer, providing user data; and
at the host computer, initiating a transmission carrying the user data to the wireless device via a cellular network comprising the radio access node, wherein the radio access node performs any of the steps of any of Embodiments 19 to 31.

Embodiment 40

The method of the previous embodiment, further comprising, at the radio access node, transmitting the user data.

Embodiment 41

The method of the previous 2 embodiments, wherein the user data is provided at the host computer by executing a host application, the method further comprising, at the wireless device, executing a client application associated with the host application.

Embodiment 42

A wireless device configured to communicate with a radio access node, the wireless device comprising a radio interface and processing circuitry configured to perform the method of the previous 3 embodiments.

Embodiment 43

A communication system including a host computer comprising:
processing circuitry configured to provide user data; and
a communication interface configured to forward user data to a cellular network for transmission to a wireless device;
wherein the wireless device comprises a radio interface and processing circuitry, the wireless device's components configured to perform any of the steps of any of Embodiments 1 to 18.

Embodiment 44

The communication system of the previous embodiment, wherein the cellular network further includes a radio access node configured to communicate with the wireless device.

Embodiment 45

The communication system of the previous 2 embodiments, wherein:
the processing circuitry of the host computer is configured to execute a host application, thereby providing the user data; and
the wireless device's processing circuitry is configured to execute a client application associated with the host application.

Embodiment 46

A method implemented in a communication system including a host computer, a radio access node, and a wireless device, the method comprising:
at the host computer, providing user data; and
at the host computer, initiating a transmission carrying the user data to the wireless device via a cellular network comprising the radio access node, wherein the wireless device performs any of the steps of any of Embodiments 1 to 18.

Embodiment 47

The method of the previous embodiment, further comprising at the wireless device, receiving the user data from the radio access node.

Embodiment 48

A communication system including a host computer comprising:
communication interface configured to receive user data originating from a transmission from a wireless device to a radio access node;
wherein the wireless device comprises a radio interface and processing circuitry, the wireless device's processing circuitry configured to perform any of the steps of any of Embodiments 1 to 18.

Embodiment 49

The communication system of the previous embodiment, further including the wireless device.

Embodiment 50

The communication system of the previous 2 embodiments, further including the radio access node, wherein the radio access node comprises a radio interface configured to communicate with the wireless device and a communication interface configured to forward to the host computer the user data carried by a transmission from the wireless device to the radio access node.

Embodiment 51

The communication system of the previous 3 embodiments, wherein:
- the processing circuitry of the host computer is configured to execute a host application; and
- the wireless device's processing circuitry is configured to execute a client application associated with the host application, thereby providing the user data.

Embodiment 52

The communication system of the previous 4 embodiments, wherein:
- the processing circuitry of the host computer is configured to execute a host application, thereby providing request data; and
- the wireless device's processing circuitry is configured to execute a client application associated with the host application, thereby providing the user data in response to the request data.

Embodiment 53

A method implemented in a communication system including a host computer, a radio access node, and a wireless device, the method comprising:
- at the host computer, receiving user data transmitted to the radio access node from the wireless device, wherein the wireless device performs any of the steps of any of the Group A embodiments.

Embodiment 54

The method of the previous embodiment, further comprising, at the wireless device, providing the user data to the radio access node.

Embodiment 55

The method of the previous 2 embodiments, further comprising:
- at the wireless device, executing a client application, thereby providing the user data to be transmitted; and
- at the host computer, executing a host application associated with the client application.

Embodiment 56

The method of the previous 3 embodiments, further comprising:
- at the wireless device, executing a client application; and
- at the wireless device, receiving input data to the client application, the input data being provided at the host computer by executing a host application associated with the client application;

wherein the user data to be transmitted is provided by the client application in response to the input data.

Embodiment 57

A communication system including a host computer comprising a communication interface configured to receive user data originating from a transmission from a wireless device to a radio access node, wherein the radio access node comprises a radio interface and processing circuitry, the radio access node's processing circuitry configured to perform any of the steps of any of Embodiments 19 to 31.

Embodiment 58

The communication system of the previous embodiment further including the radio access node.

Embodiment 59

The communication system of the previous 2 embodiments, further including the wireless device, wherein the wireless device is configured to communicate with the radio access node.

Embodiment 60

The communication system of the previous 3 embodiments, wherein:
- the processing circuitry of the host computer is configured to execute a host application; and
- the wireless device is configured to execute a client application associated with the host application, thereby providing the user data to be received by the host computer.

Embodiment 61

A method implemented in a communication system including a host computer, a radio access node, and a wireless device, the method comprising:
- at the host computer, receiving, from the radio access node, user data originating from a transmission which the radio access node has received from the wireless device, wherein the wireless device performs any of the steps of any of the Group A embodiments.

Embodiment 62

The method of the previous embodiment, further comprising at the radio access node, receiving the user data from the wireless device.

Embodiment 63

The method of the previous 2 embodiments, further comprising at the radio access node, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).
2G Second Generation
3G Third Generation
3GPP Third Generation Partnership Project
5G Fifth Generation ACK Acknowledgement
AP Access Point
ASIC Application Specific Integrated Circuit
BLER Block Error Rate
CP Cyclic Prefix
CPU Central Processing Unit
CQI Channel Quality Indicator
CRS Cell Specific Reference Signal
CSI Channel State Information
CSI-RS Channel State Information Reference Signal
DCI Downlink Control Information
DMRS Demodulation Reference Signal
DSP Digital Signal Processor
eNB Enhanced or Evolved Node B
EPRE Energy Per Resource Element
FFS For Further Study
FPGA Field Programmable Gate Array
gNB New Radio Node B
HARQ Hybrid Automatic Repeat Request
LTE Long Term Evolution
MCS Modulation and Coding Scheme
MME Mobility Management Entity
ms Millisecond
MTC Machine Type Communication
MU-MIMO Multi User Multiple Input Multiple Output
NR New Radio
OFDM Orthogonal Frequency Division Multiplexing
OTT Over-the-Top
PBCH Physical Broadcast Channel
PDSCH Physical Downlink Shared Channel
P-GW Packet Gateway
PMI Precoding Matrix Indicator
PRB Physical Resource Block
PTRS Phase Tracking Reference Signal
RAN Radio Access Network
RB Resource Block
RE Resource Element
RI Rank Indicator
ROM Read Only Memory
RRC Radio Resource Control
RRH Remote Radio Head
SCEF Service Capability Exposure Function
SU-MIMO Single User Multiple Input Multiple Output
TB Transport Block
TBS Transport Block Size
TS Technical Specification
UE User Equipment
URLLC Ultra-Reliable and Low Latency Communication
VoIP Voice over Internet Protocol Those skilled in the art will recognize improvements and modifications to the embodiments of the present disclosure. All such improvements and modifications are considered within the scope of the concepts disclosed herein.

What is claimed is:

1. A method performed by a wireless device for Channel Quality Indicator, CQI, index reporting in a wireless communication system, the method comprising:
    deriving a CQI index to be reported to a network node, where the CQI index is derived assuming a hypothetical transmission on a Channel State Information, CSI, reference resource, wherein a wireless device-specific reference signal overhead in the CSI reference resource is consistent with one or more parameters; and
    reporting the CQI index to the network node.

2. The method of claim 1, wherein the one or more parameters comprise a most recent reported rank for a respective CSI Report Setting.

3. The method of claim 1, wherein the one or more parameters comprise a number of additional Demodulation Reference Signal, DMRS, symbols.

4. The method of claim 1, wherein the one or more parameters comprise a DMRS pattern.

5. The method of claim 1, wherein the one or more parameters comprise a number of front loaded DMRS symbols.

6. The method of claim 1, wherein the one or more parameters comprise reserved resources configured for the wireless device.

7. The method of claim 1, wherein the one or more parameters comprise a number of Orthogonal Frequency Division Multiplexing, OFDM, symbols in the CSI reference resource.

8. The method of claim 7, wherein the number of OFDM symbols in the CSI reference resource is a number of OFDM symbols used in a corresponding valid downlink subframe related to the CSI reference resource.

9. The method of claim 1, wherein the one or more parameters comprise a semi-statically configured slot-format.

10. The method of claim 1, wherein the CQI index is associated with a Phase Tracking Reference Signal, PTRS, density and/or pattern within the CSI reference resource.

11. The method of claim 10, wherein the CQI index is associated with the PTRS density and/or pattern via a configuration.

12. The method of claim 10, wherein the CQI index is associated with the PTRS density and/or pattern via a predefined association.

13. The method of claim 10, wherein the CQI index is associated with the PTRS density and/or pattern via a predefined rule.

14. The method of claim 1, wherein deriving the CQI index to be reported comprises deriving the CQI index to be reported based on:
    the wireless device-specific reference signal overhead in the CSI reference resource; and
    PTRS overhead in the CSI reference resource, wherein the PTRS overhead in the CSI reference resource varies for different CQI indices in accordance with PTRS densities and/or patterns associated with the different CQI indices.

15. The method of claim 1, wherein the CQI index is one of a plurality of CQI indices, and at least two CQI indices of the plurality of CQI indices are associated with different PTRS densities and/or patterns.

16. A wireless device for Channel Quality Indicator, CQI, index reporting in a wireless communication system, comprising:
    one or more transmitters and one or more receivers; and
    one or more processors associated with the one or more transmitters and the one or more receivers, the one or more processors configured to cause the wireless device to:
        derive a CQI index to be reported to a network node, where the CQI index is derived assuming a hypothetical transmission on a Channel State Information, CSI, reference resource, wherein a wireless device-specific reference signal overhead in the CSI reference resource is consistent with one or more parameters; and
        report the CQI index to the network node.

17. A method performed by a radio access node for Channel Quality Indicator, CQI, index reporting in a wireless communication system, the method comprising:

receiving a reported CQI index from a wireless device for a Channel State Information, CSI, reference resource, wherein a wireless device-specific reference signal overhead in the CSI reference resource is consistent with one or more parameters.

18. The method of claim 17, wherein the one or more parameters comprise a most recent reported rank for a respective CSI Report Setting.

19. The method of claim 17, wherein the one or more parameters comprise a number of additional Demodulation Reference Signal, DMRS, symbols.

20. The method of claim 17, wherein the one or more parameters comprise a DMRS pattern.

21. The method of claim 17, wherein the one or more parameters comprise a number of front loaded DMRS symbols.

22. The method of claim 17, wherein the one or more parameters comprise reserved resources configured for the wireless device.

23. The method of claim 17, wherein the one or more parameters comprise a number of Orthogonal Frequency Division Multiplexing, OFDM, symbols in the CSI reference resource.

24. The method of claim 17, wherein the reported CQI index is one of a plurality of CQI indices, and at least two CQI indices of the plurality of CQI indices are associated with different PTRS densities and/or patterns.

25. The method of claim 17, further comprising:
obtaining user data; and
forwarding the user data to a host computer or the wireless device.

26. A radio access node for Channel Quality Indicator, CQI, index reporting in a wireless communication system, comprising:
one or more transmitters and one or more receivers; and
one or more processors associated with the one or more transmitters and the one or more receivers, the one or more processors configured to cause the wireless device to:
receive a reported CQI index from a wireless device for a Channel State Information, CSI, reference resource, wherein a wireless device-specific reference signal overhead in the CSI reference resource is consistent with one or more parameters.

* * * * *